United States Patent [19]

Graham, Jr.

[11] Patent Number: 4,914,874

[45] Date of Patent: Apr. 10, 1990

[54] SYSTEM FOR INTERCONNECTING PANELS OF CONTAINERS

[76] Inventor: Andrew S. Graham, Jr., 2802 Jefferson Ct., Ambler, Pa. 19002

[21] Appl. No.: 293,828

[22] Filed: Jan. 5, 1989

Related U.S. Application Data

[60] Division of Ser. No. 117,215, Nov. 4, 1987, Pat. No. 4,796,392, which is a continuation-in-part of Ser. No. 841,477, Mar. 19, 1986, abandoned, which is a continuation-in-part of Ser. No. 710,492, Mar. 11, 1985, Pat. No. 4,584,806.

[51] Int. Cl.$^4$ .............................................. E04G 13/02
[52] U.S. Cl. .................................... 52/79.1; 220/4 F; 220/1.5; 217/43 A
[58] Field of Search ........... 220/4 F; 217/43 A, 43 R, 217/12 R, 13 R, 69 R, 63 R; 52/79.1

[56] References Cited

U.S. PATENT DOCUMENTS

| | | | |
|---|---|---|---|
| 2,890,809 | 6/1959 | Poley | 217/43 A |
| 3,945,601 | 3/1976 | Rowley | 249/48 |
| 4,584,806 | 4/1986 | Graham | 52/584 |

FOREIGN PATENT DOCUMENTS

| | | | |
|---|---|---|---|
| 1270581 | 7/1961 | France | 217/43 A |

*Primary Examiner*—Henry E. Raduazo
*Attorney, Agent, or Firm*—Charles H. Lindrooth

[57] ABSTRACT

Modular system for making containers, including reusable panels for the side walls of the containers, the side wall panels having horizontal edge portions providing for guided vertical stacking of the panels, the side wall panels also having fastening devices adjacent the upright corners of the containers, with the end portions of the panels overlapping each other in a series in one direction around the perimeter of the containers, and with fastening devices including fastening plates in a series overlapping each other in the opposite direction around the perimeter of the containers.

6 Claims, 19 Drawing Sheets

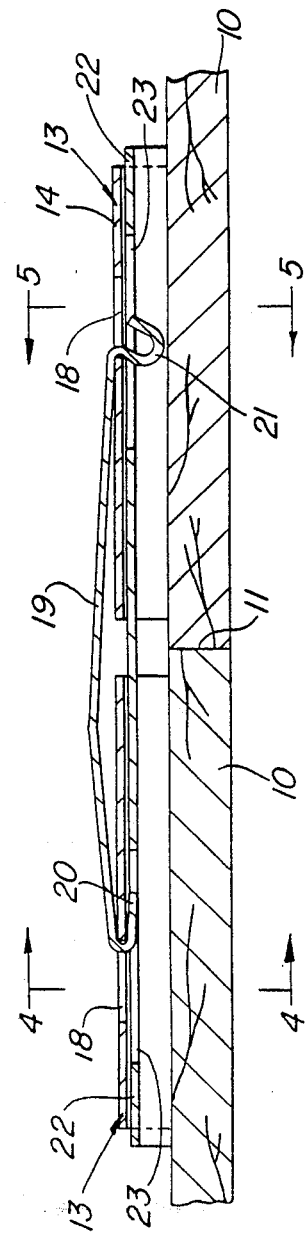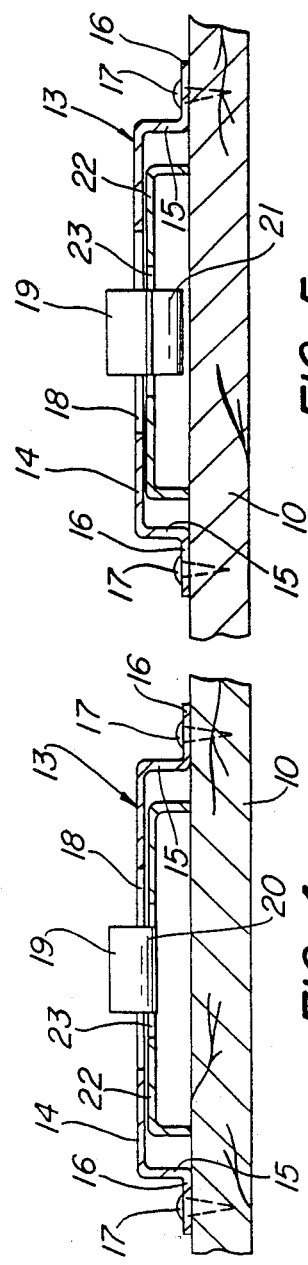

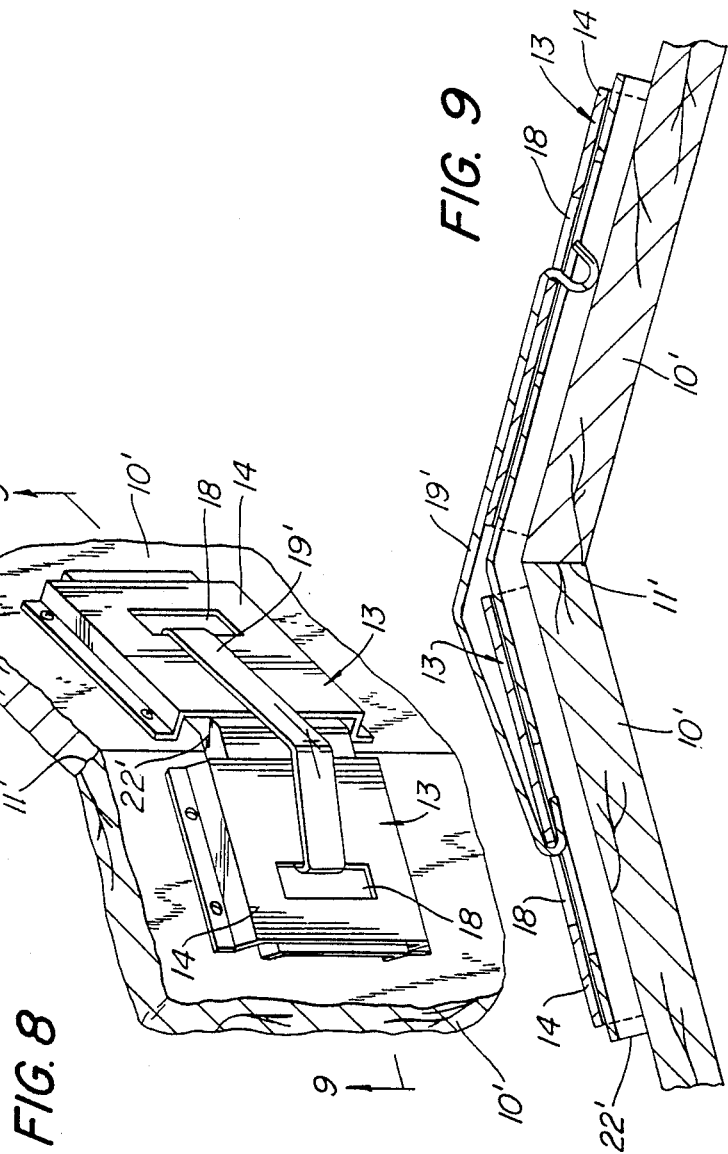

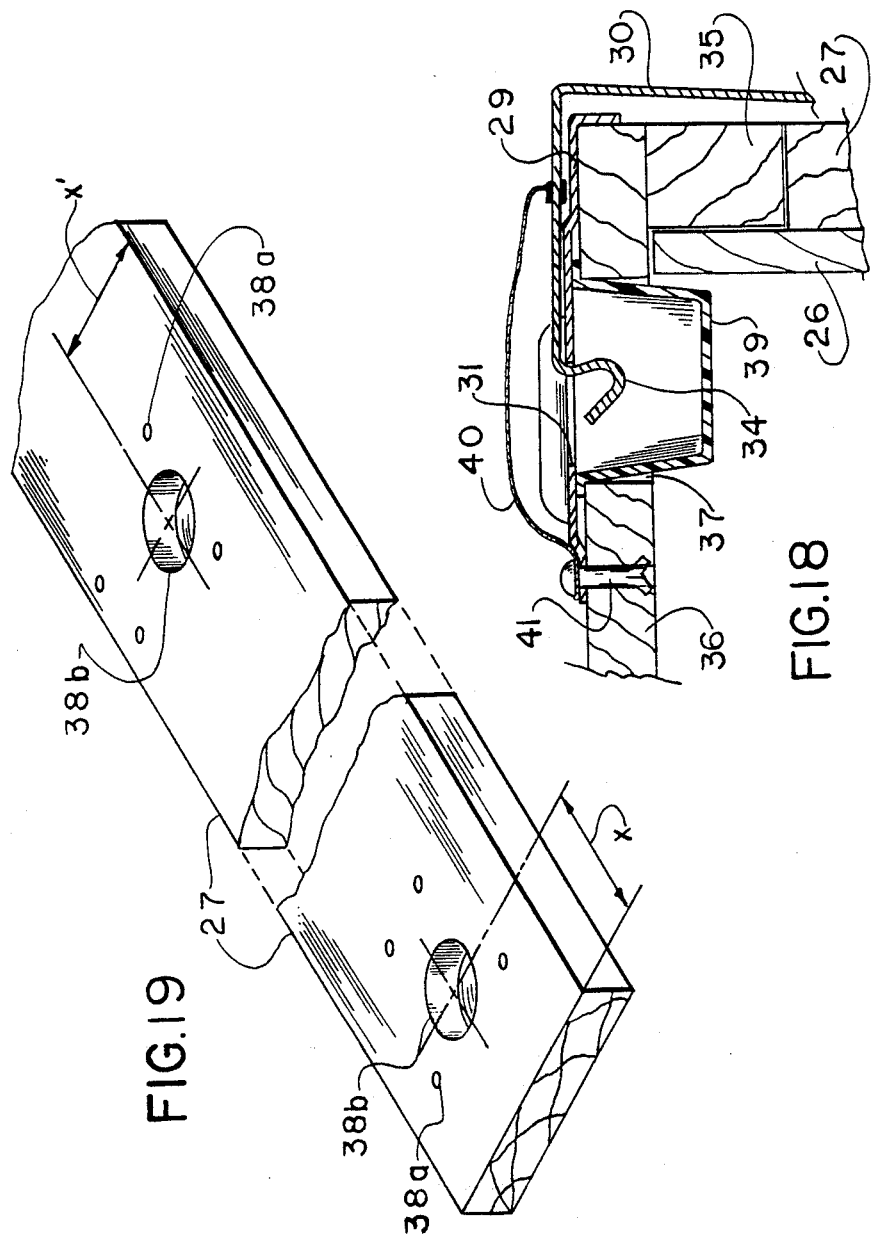

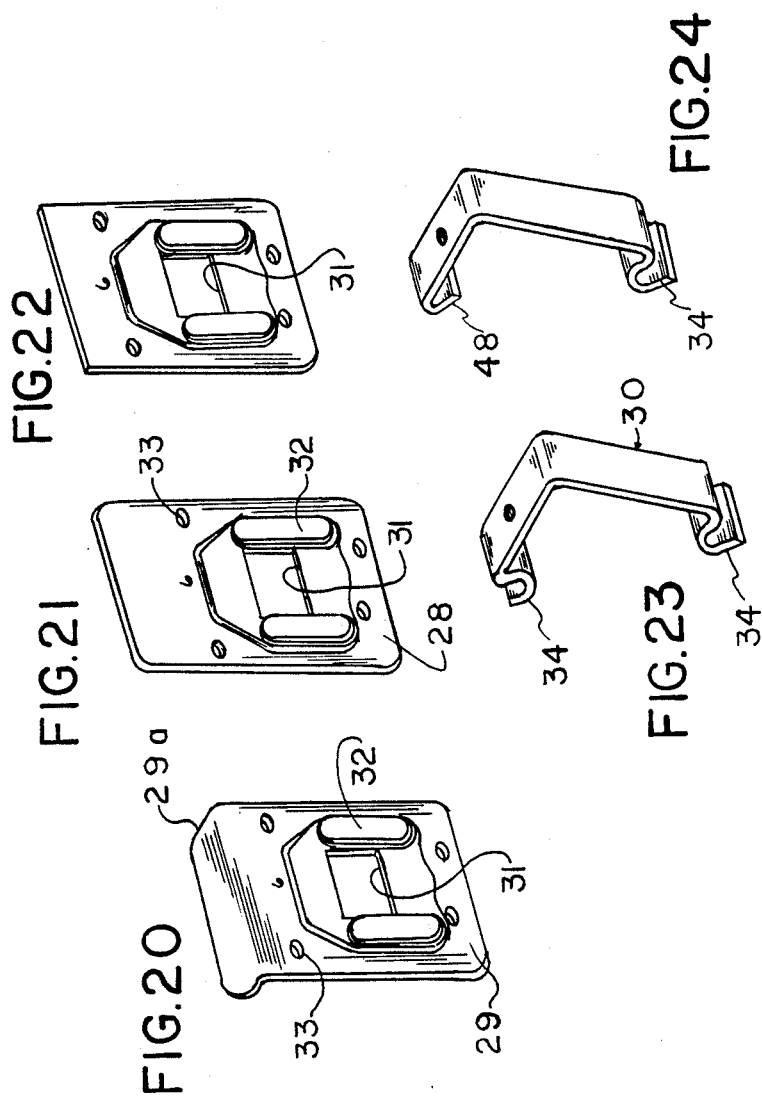

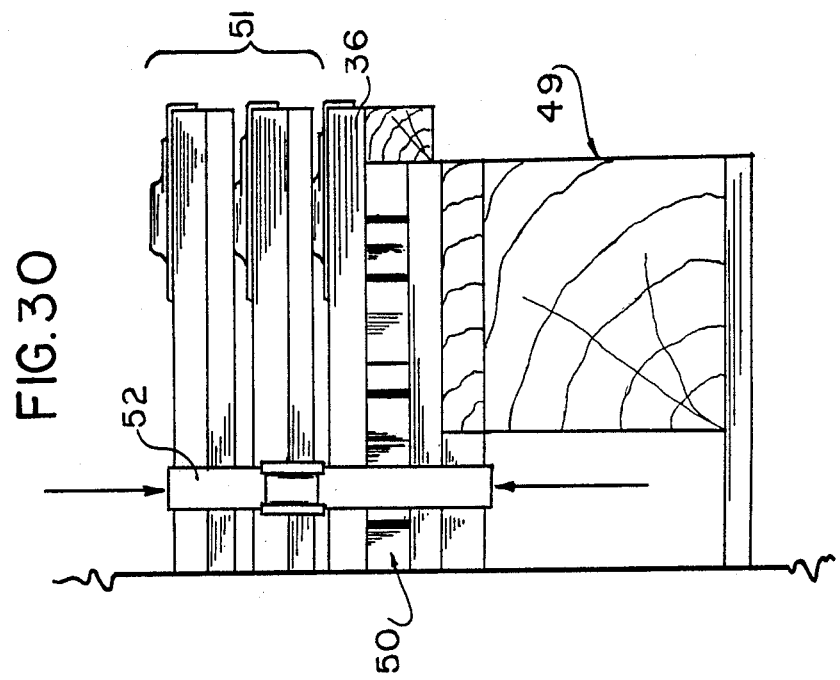
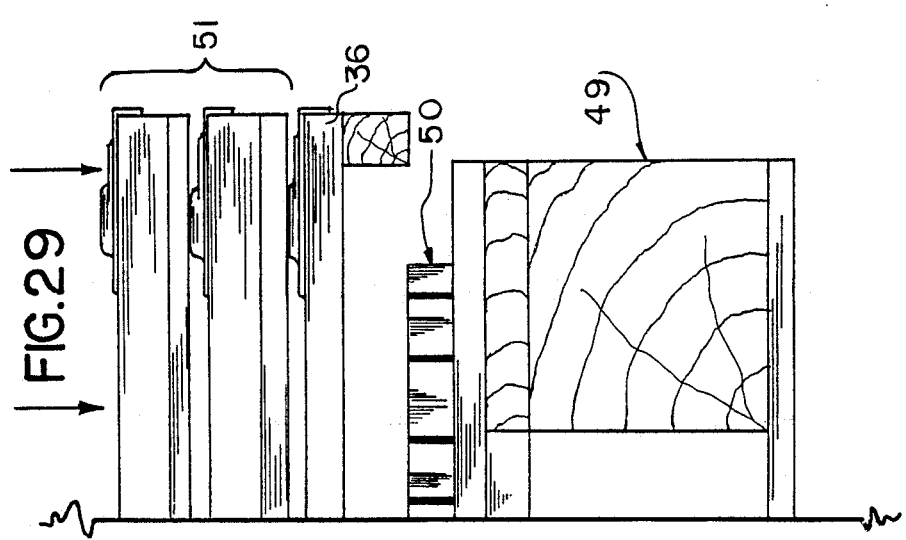

SYSTEM FOR INTERCONNECTING PANELS OF CONTAINERS

CROSS REFERENCE

The present application is a continuation-in-part of my prior application Ser. No. 117,215, filed Nov. 4, 1987, and issued on Jan. 10, 1989 as U.S. Pat. No. 4,796,392, which is a continuation-in-part of my prior application Ser. No. 841,477, filed Mar. 19, 1986, now abandoned, which is a continuation-in-part of my prior application Ser. No. 710,492, filed Mar. 11, 1985, and issued Apr. 29, 1986 as U.S. Pat. No. 4,584,806.

BACKGROUND AND STATEMENT OF OBJECTS

The present invention is concerned with various forms of cartons, containers and enclosures formed of panels, particularly where the panels are adapted for repeated reuse and the invention is concerned with systems and devices for assembling and interconnecting the panels in a manner providing simple and sturdy panel interconnection and simplicity in panel separation.

One of the important objectives of the invention is to provide a novel interrelationship of panel parts and of interconnecting or fastening devices which greatly increases the strength and rigidity of the containers formed while at the same time providing for ready separation and reassembly of the container components.

In another important aspect of the invention, components such as the panels employed are arranged and proportioned to provide a modular system in which various of the panels may be employed in various combinations providing containers or enclosures of various different sizes and shapes.

The present invention is also concerned with a system for interconnecting panels, particularly panels of a carton or container where the panels are arranged in edge-to-edge relation either in the same plane or in planes at angles to each other where such angle lies between the same plane (180 degree relationship) and the typical 90 degree relationship at the corners of conventional cartons.

Panel interconnecting systems are well known, especially for the interconnection of panels along the corners or edges of a rectangular carton where the panels extend from each other usually at angles of 90 degrees. Such known fastening systems customarily include connector plates which are fastened to the panels near the 90 degree corner, together with a spring clip extended around the corner and engaging the connector plates. The prior art connection systems of the kind just referred to are not well adapted to the interconnection of panels where the panels lie in the same plane or at some angle to each other greater than the 90 degree angle.

One of the objects of the present invention is to provide a fastening system especially adapted to the interconnection of panels lying in or close to a common plane and providing for snug and secure fastening or interconnection of the panels in a direction across the panel joint, and the arrangement of the invention provides not only for a secure attachment of the panels to each other, but the invention also makes provision for resisting undesired relative shifting movements of the panels in directions paralleling the joint between the panels.

It is a further object of the invention to provide for convenient and simple application of the fastening components and also for ready separation of the joint, thereby contributing to the ease of assembly of shipping cartons and ready separation of the parts for reuse in subsequent packaging.

Still another object of the invention is to provide a system for panel interconnection especially where the panels lie in the same plane and readily adapted to the interconnection of panels or panel pieces of various different sizes and shapes, so that the same fastening devices can be employed in the assembly of cartons of various sizes and shapes in some of which different numbers of panel pieces are used.

While certain features of the invention are of particular advantage in the interconnection of panels lying in planes in a range from 180 degrees to 90 degrees, nevertheless the invention provides connectors which can also be used for interconnection of panels lying in planes even at angles sharper than the 90 degree relationship.

It is a further object of the invention to provide a system for carton panel interconnection incorporating panels having fastening plates for fastening devices along at least one panel edge, the fastening plates at said one edge including plates of two different configurations, one of which is adapted for use in connection with another panel lying in the same plane and the other of which is adapted for use in connection with another panel at a corner of the carton. This provides for alternative use of a given carton panel alternatively in cartons of different configurations.

In accordance with another object of the invention, provision is made for the use of panels having not only the serial corner interconnection system referred to above but also having horizontal edge portions configured to provide for guided vertical overlapping of the panels.

It is also to be understood that the fastening devices of the present invention are applicable not only to cartons but also to a wide variety of enclosures or the like, such as boxes, containers, vessels, structural partitioning or enclosures, used, for example, for human occupancy, and the use of the term container herein is not to be understood in a limited sense.

Brief Description of Drawings

How the foregoing and other objects and advantages are attained will be clear from the following description referring to the accompanying drawings, in which:

FIGS. 1 to 9

FIGS. 1 to 9 correspond to the Figures disclosed in my prior application Ser. No. 710,492 above-identified, and are particularly concerned with the use of panel interconnecting or fastening devices employing bridge plates extended across panel joints where the panels lie in a common plane or in planes extended at angles greater than the 90 degree relationship of rectangular containers, as follows:

FIG. 1 is an elevational view of one side of a carton in which several panel pieces of different sizes are fastened together by fastening devices of the kind herein disclosed employing bridge plates;

FIG. 2 is a perspective view of fragments of adjoining panels and illustrating a fastening device incorporating a bridge plate according to the invention applied thereto:

FIG. 3 is a fragmentary transverse sectional view taken as indicated by the section line 3—3 on FIG. 2;

FIG. 4 and 5 are transverse sectional views taken as indicated by the section lines 4—4 and 5—5 on FIG. 3.

FIG. 6 is a somewhat diagrammatic exploded perspective view of the parts of a fastening device according to the invention;

FIG. 7 is a view similar to FIG. 6 but illustrating the panel connecting components modified for application to a pair of panels lying n planes diverging somewhat from the common plane shown in FIGS. 1 to 6, inclusive;

FIG. 8 is a view similar to FIG. 2 but illustrating the modified arrangement which also appears in FIG. 7; and FIG. 9 is a view similar to FIG. 3 but illustrating the modified arrangement of FIGS. 7 and 8, FIG. 9 being taken as indicated by the section line 9-9 on FIG. 8.

FIGS. 10-32

FIGS. 10 to 32 correspond to figures of the same numbers included in my prior application Ser. No. 117,215 above-identified, and illustrate various features and aspects of the present invention relating to the upright corner interconnection of panels, many of which features are adapted for use in combination with features illustrated in FIGS. 1 to 9, FIGS. 10 to 32 being further identified as follows:

FIG. 10 is a view of a partially assembled rectangular container incorporating a plurality of panels on each side;

FIG. 11 is an enlarged, detailed view of a corner joint constructed according to the present invention and including a spring clip fastening device specially configured and particularly adapted for use at an upright corner of a rectangular container constructed according to the present invention;

FIG. 12 is a view similar to FIG. 10 but illustrating another modular arrangement of panels in a rectangular container according to the present invention;

FIG. 13 is a view of a rectangular container having a plurality of superimposed panels on each side;

FIG. 14 is a view illustrating another embodiment of a rectangular container in which the panels on three of the four sides extend throughout the entire area of the container wall and in which the fourth side is made up of modular panels each overlying only a portion of the fourth side;

FIG. 15 a view illustrating the modular use of panels according to the invention to form a plurality of sizes and shapes of rectangular containers;

FIG. 16 is an enlarged, detailed view of a portion of a spring clip fastening device and further including a special form of a clip-securing component;

FIG. 17 is a detailed view, partly in section, illustrating the engagement of the spring clip-securing component in an aperture in one of the mounting plates for the spring clip fastening device;

FIG. 18 is an enlarged detailed vertical sectional view through a portion of a lid and a side wall of a container and illustrating the application of a spring clip fastening device, together with the application of a cup employed to seal an aperture in the top surface;

FIG. 19 is an enlarged view with portions broken away, illustrating the relationship of apertures which may be provided in battens or reinforcement strips employed on panels such as shown in FIGS. 10 to 15;

FIGS. 20, 21 and 22 are views illustrating alternative forms of one of the mounting plates for the spring clips employed at corners of the containers;

FIGS. 23 and 24 shown two alternative forms of fastening spring clips contemplated for use according to the invention;

FIG. 25 is a view of an enclosure formed of a plurality of panels on each side and at the top and arranged to serve as a shelter for human occupancy;

FIG. 26 is an exploded view of portions of the paneled walls of an enclosure having a multiplicity of panels on each wall and arranged to provide for human occupancy, as in the shelter of FIG. 25;

FIGS. 27 and 28 show alternative forms of enclosures of the general kind shown in FIGS. 25 and 26 but being of different proportions and arrangements;

FIGS. 29 and 30 are enlarged, fragmentary views of the assembly of panels and a pallet, together with spring clip fastening devices, the assembly being arranged to facilitate storage or shipment;

FIG. 31 is a view of an enclosure or carton of a form in which each wall comprises a plurality of panels at least some of which have individual edges provided with panel fastening devices of different types adapted for alternative use with adjacent edges of panels lying in the same plane or sides of a corner; and FIG. 32 is an enlarged view of certain of the panel fastening devices shown in FIG. 31 as indicated by the dash line square 32—32 applied to FIG. 31.

FIGS. 33-42

FIGS. 33-42 illustrate forms of containers incorporating panels not only having serial overlap at the upright corners of the container but further providing for guided vertical overlap of the panels, these figures being further identified as follows:

FIG. 33 is a view of a carton having panels used in an embodiment providing not only for the serial overlap at the upright corners, but also providing for vertical overlap between upper and lower panels, this view being shown in perspective with the parts exploded;

FIG. 34 is a view of the embodiment of FIG. 33 on a reduced scale but showing the parts in assembled relation;

FIG. 36 is a view of another embodiment, showing the parts exploded as in FIG. 34, this embodiment including multiple horizontal panels in one side wall of the container between complete wall-type panels at the other three sides of the container;

FIG. 37 is a view on a reduced scale similar to FIG. 34 but illustrating the assembled parts of the arrangement shown in FIG. 36;

FIG. 38 is a view similar to FIG. 37 but illustrating the container after removal of the uppermost panel at the front side of the container;

FIG. 39 is a view similar to FIG. 38 but showing the container after removal of two of the horizontal panels at the front side of the container;

FIG. 40 is a horizontal, sectional view of the embodiment of FIGS. 36 to 39, this view being taken as indicated by the section line 40—40 as applied to FIG. 37, illustrating the overlapping parts at the corners, but omitting the fastening clips and the apertured clip plates;

FIG. 41 is a view similar to FIG. 34 but illustrating an embodiment of the container in which the panels at the front and back sides of the container are of greater length than the arrangement of FIG. 34, FIG. 41 further illustrating the use of a planar panel interconnecting device at one of the sides incorporating the longer panels; and FIG. 42 is a view similar to FIG. 11 but illustrating the configuration at a typical corner of an embodiment such as shown in FIG. 34 in which the vertically overlapping panel parts are arranged not only for vertical overlapping but also for serial overlapping around the perimeter of the container.

DETAILED DESCRIPTION

Figure 1:
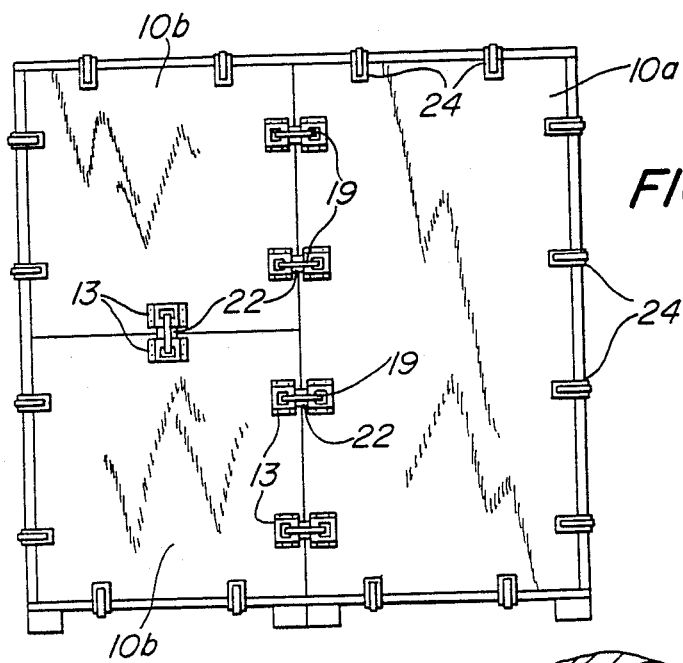

Before considering various details of the components employed according to the invention, it is first pointed out that the invention contemplates employment of spring clip fastening devices which, in general, are of two different types, one of which is particularly adapted for the interconnecting of panels lying in a common plane, and the other of which is particularly adapted for the interconnection of panels adjoining each other at corners of the container where the panels are at right angles to each other, as in the upright corners of a container defining a generally rectangular container volume.

In addition to the use of the fastening devices of the two kinds just referred to, the invention contemplates positioning and interconnection of panels in a container in a novel manner, particularly at the upright corners of a rectangular container, in order to increase the strength of the container and, at the same time, provide facility for incorporation of various panels in a variety of interrelationships and thereby provide a modular system adapted to the formation of various containers of different sizes and shapes while employing components, such as the panels and also the fastening devices, of the same or similar construction.

As will be seen from the detailed description hereinafter, FIGS. 33-42 illustrate containers which may not only incorporate various features of FIGS. 1-9 and of FIGS. 10-32, but further providing for guided vertical stacking of superimposed panels.

The special interrelationship of the panels of a container contemplated according to the present invention and the interaction of that interrelationship with the special forms of spring clip fastening devices will be considered hereinafter, but attention is first directed to one specific form of the spring clip fastening devices employed according to the invention, i.e., the form of such fastening devices as disclosed in my issued U.S. Pat. No. 4,584,806, identified above, of which the present invention is a continuation-in-part.

FIGS. 1 to 9

Reference is first made to the embodiment illustrated in FIGS. 1 to 6, inclusive. The panels shown as being interconnected in this embodiment are indicated at 10—10. The fastening devices of the invention are applicable to panels formed of a variety of materials including metals and plastics, but in most cartons or containers, the panel material comprises wood, either in the form of plain wood slabs or in the form of plywood or wood particle board.

In this embodiment, and also in other embodiments, the fastening devices are preferably formed of sheet metal and, in general, the components of the fastening devices are relatively thin as compared with the panels of which the containers are made.

As seen in FIGS. 2 to 6, the panels 10—10 lie in a common plane and meet at a joint 11, the fastening device being associated with the edges of the panels near the joint. Each of the devices for interconnecting the two adjoining panels includes four components comprising a pair of connector plates, one mounted near the edge of each panel, a bridge plate spanning the joint between the panels and a spring clip for holding the parts in assembled relation.

Each connector plate is generally indicated by the reference numeral 13. Each connector plate includes a metal channel 14 having flanges 15 with marginal strips 16 apertured to pass the fastening screws 17 by which the connector plates are secured to the panels.

Figure 2:
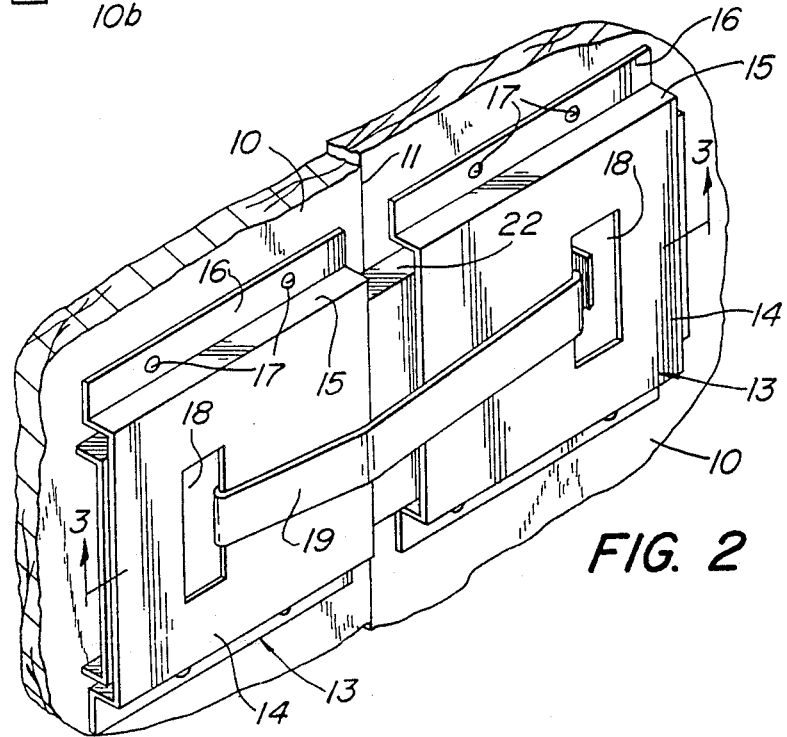
Figure 6:
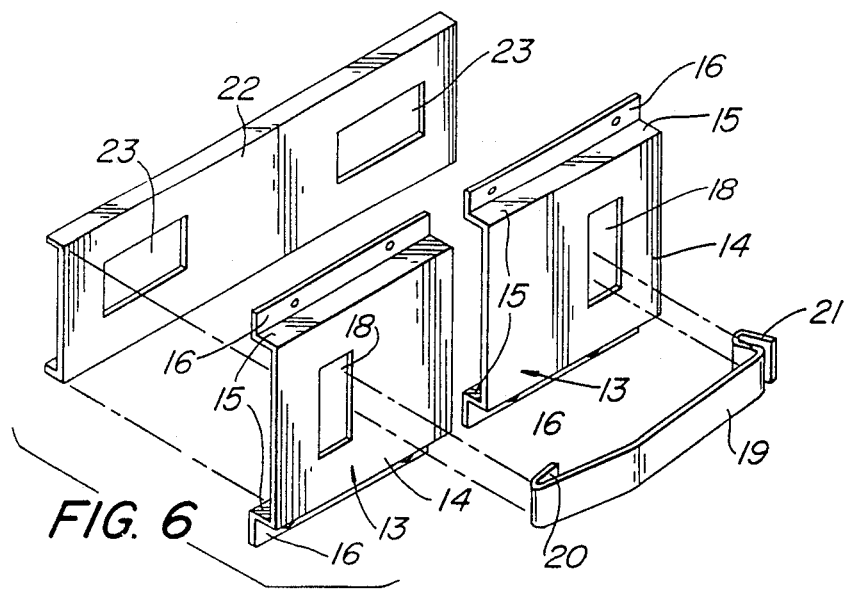

From the drawings, it will be noted that each connector plate is mounted on the panel in a position so as to define cavities lying along the panel and having openings presented toward each other across the panel joint. Each connector plate also has apertures 18 formed therein and adapted to cooperate with the fastening means provided at the ends of the spring clip 19 which comprises the fastening component of the joint. As shown in FIG. 6, the spring clip 19 is provided with a bent hook 20 at one end and also with a detent 21 at the other end. In the assembling operation, the hook 20 is first engaged in one of the apertures 18 in one of the connector plates, and the detent 21 is then inserted into the aperture 18 of the other connector plate. The spring clip 19, as best seen in FIGS. 2, 3 and 6, has a curvature facilitating the insertion of the detent when the parts are being assembled, and this curvature will vary according to the angle of the panels being connected.

In the embodiment illustrated in FIGS. 1 to 6, each connector or spring clip 19 is shown as having a hook at one end and a detent at the other end, but it is to be understood that the interengaging means at the ends of the connector or spring clip may take the form of a detent at both ends.

The connector plates and the spring clip comprise the components which hold the panels together at opposite sides of the joint 11, the spring clip preferably being configured so that the edges of the panels are brought together into snug engagement without clearance.

Although the connector plates and the spring clip will provide an effective connection between the two panels, as above described, the panels, being extended in a common plane or in edge-to-edge relation in somewhat inclined planes (as described hereinafter with reference to the embodiment shown in FIGS. 7, 8 and 9), would still remain free for relative shifting movement of the panels either angularly or transversely with respect to each other in the absence of some fastening means in addition to the spring clip. For this purpose, the invention provides what is herein referred to as a bridge plate. In the embodiment of FIGS. 1 to 6, this bridge plate is indicated by the reference numeral 22. It will be seen that the bridge plate comprises a channel-shaped component extended across the panel joint and into the cavities provided within the connector plates. The bridge plate also has apertures 23 formed therein and, as seen in FIG. 6, those apertures are in registry with the apertures 18 in the connector plates when the parts are assembled at the panel joint. The apertures 23 are larger than the apertures 18 in a direction transverse to the joint between the panels, the apertures 23 being positioned and proportioned so that they will not restrict or interfere with the action of the spring clip 19 in its cooperation with the apertures 18 when the spring clip is applied to complete the panel joint. The presence of the apertures 23 and the projection of the fastening elements 20 and 21 of the spring clip not only into the apertures 18 at the connector plates but also into the apertures 23 of the bridge plate serves the purpose of preventing the bridge plate from escaping by unintentional displacement out of the openings provided within the connector plates 13.

In the preferred practice of the invention, the bridge plate is desirably dimensioned in a direction perpendicular to the panels and to the connector plates so that only very small clearance is provided between the top of the bridge plate and the under side of the connector plates. Providing only small clearance is of importance in preventing the panels from shifting in relation to each other in a direction perpendicular to the plane of the panels or in angularly tilting with respect to each other.

From the above, it will be seen that the interpositioning of the panels is effected in the direction toward and away from each other by means of the spring clip, but is effected in other directions by means of the interfitting of the bridge plate and the connector plates.

Another aspect of the fastening devices of the present invention is illustrated in FIG. 1. In that figure, it will be noted that the wall of the carton there shown is made up of a panel 10a, having an area equal to one-half of the total sidewall of the carton, together with two panels 10b, each of which represents about one-quarter of the total area of the wall. The spring clips and connector plates of the joints serve to interconnect the three panel pieces 10 a, 10b and 10b, but as will be realized from inspection of FIG. 1, the same parts mounted on other panel pieces lying in the same plane may alternatively be used in order to interconnect panel pieces in different arrangements. For example, four panel pieces (each representing one-quarter of the area of the wall) could be interconnected by means of the connector plates; or a wall such as indicated in FIG. 1 could be formed by means of two panel pieces such as shown at 10a, each comprising one-half of the wall, instead of employing the one-quarter size pieces indicated at 10b. Various combinations may thus be employed in accordance with the invention.

In connection with the illustration of FIG. 1, it will be seen that the several panels there shown could be employed in containers of various different configurations, the individual panels or components being capable of use according to a modular system more fully described hereinafter with particular reference to FIGS. 10 to 32, or in a modular system of the type more fully described hereinafter with particular reference to FIGS. 33 to 42.

In FIG. 1, there is also shown at 24 a number of corner joint fastening devices, and while these may comprise corner clip fastening devices of certain known types, it is preferred to employ the type of spring clip fastening devices hereinafter particularly described in connection with FIGS. 10 to 32 (se especially FIG. 11, FIG. 16, FIG. 17 and FIGS. 20 to 24 inclusive).

Figure 7:
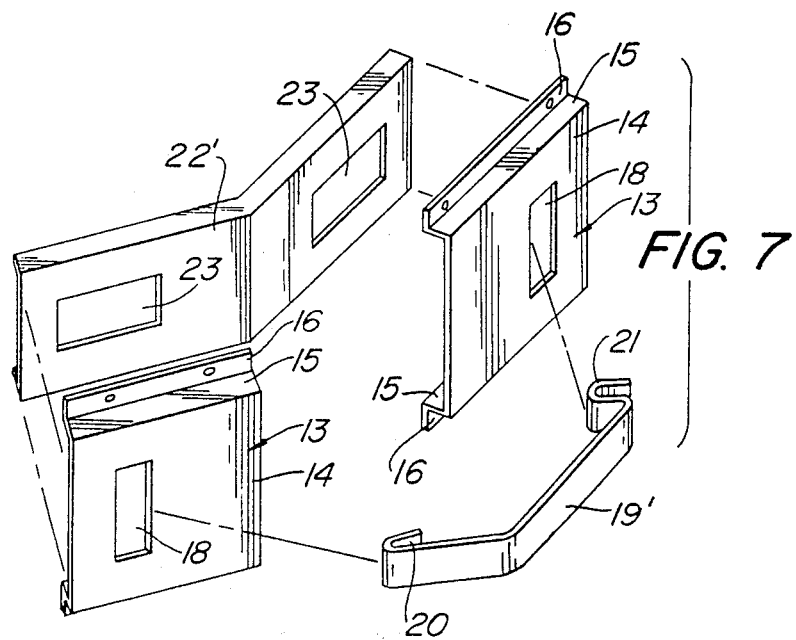

Turning now to the embodiment illustrated in FIGS. 7, 8 and 9, it is first noted that the same reference numerals have been used for the various parts but, in certain instances where the parts are of different configuration, the part has been identified by the same number, together with a prime mark (').

As best seen in FIGS. 8 and 9, the panels 10'—10' are positioned in planes at an angle to each other and may have beveled edges providing a joint 11'. It will thus be seen that the arrangement of the invention is readily adapted to the interconnection of panels lying either in the same plane or in somewhat angled planes. Although the angle of the panels in the embodiment of FIGS. 7, 8 and 9 provides a convex configuration when viewed, as in FIG. 9, it will be understood that some angularity in the concave sense may also be accommodated by joint parts in accordance with the present invention.

It will further be understood that the configuration of the spring clip 19' in the embodiment of FIGS. 7, 8 and 9 is modified as compared with the spring clip used in the first embodiment in order to readily accommodate application and removal of the spring clip, notwithstanding the relatively angled planes of the panels being connected.

Although the employment of a spring clip fastening device of the kind described above including a bridge plate such as shown at 22 in FIGS. 2 to 6 and 22' in FIGS. 7 to 9 is preferred for joints where the panels lie in a common plane or at a somewhat inclined plane as in FIGS. 7 to 9, where the joint between the panels to be connected comprises a 90 degree or right angle joint, as in typical rectangular containers, it is preferred to employ a spring clip fastening device of a different form, not including a bridge plate. Such fastening devices are somewhat diagrammatically illustrated at 24 in FIG. 1. While certain known right-angle fastening devices may be used for certain purposes, according to the present invention it is preferred to use 90 degree fastening devices of the kind fully described and explained in connection with various of the embodiments of containers as described hereinafter.

FIGS. 10 to 32

Figure 10:
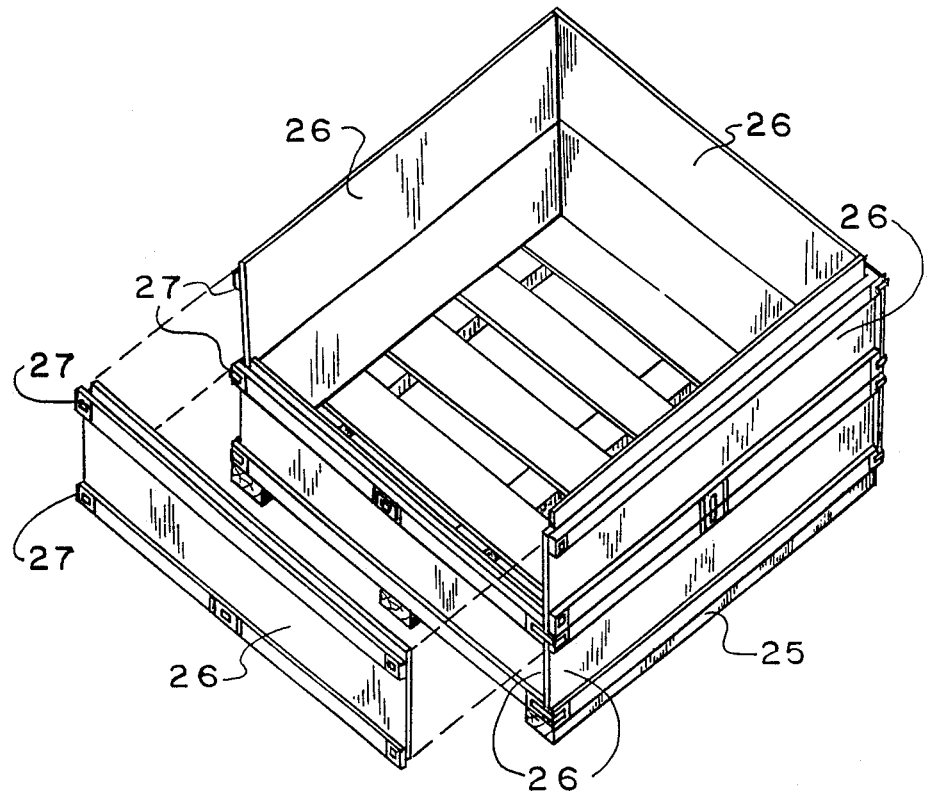

In FIG. 10, there is illustrated a carton being assembled on a pallet or base, indicated at 25. The modular system of the present invention makes possible the use of the components of this invention in connection with pallets of standard configuration and size. This carton is rectangular and each of the sides of the carton are formed by employment of two superimposed panels 26, all of which are preferably of the same construction and dimensions. In FIG. 10, three of the walls of the carton are shown as completed by the incorporation of a pair of superimposed panels 26, and the fourth side of the rectangle is shown as having the lower panel already installed, and the upper panel shown separate from the container prior to assembly. As will be seen, each of the panels of this particular container is formed of a board having batten reinforcement strips 27 positioned near the upper and lower edges of the rectangular panel, all of these components preferably being formed of wood, for instance, plywood or other sheet or strip wood material. Panels may be molded or extruded of plastic comprising both the boards 26 and the battens 27.

The illustration of FIG. 10 represents one form of a container which may be constructed according to the modular system contemplated by the present invention. One of the important aspects of the present invention providing for a highly flexible modular system relates to the manner of joining or connecting the panels at the 90 degree corners, particularly the four 90 degree upright corners occurring at the junction of the side walls defining a rectangular volume. The invention contemplates certain distinctive features employed in combination at each one of these upright corners, and the features in question are explained herebelow with particular reference to FIG. 11.

Figure 11:
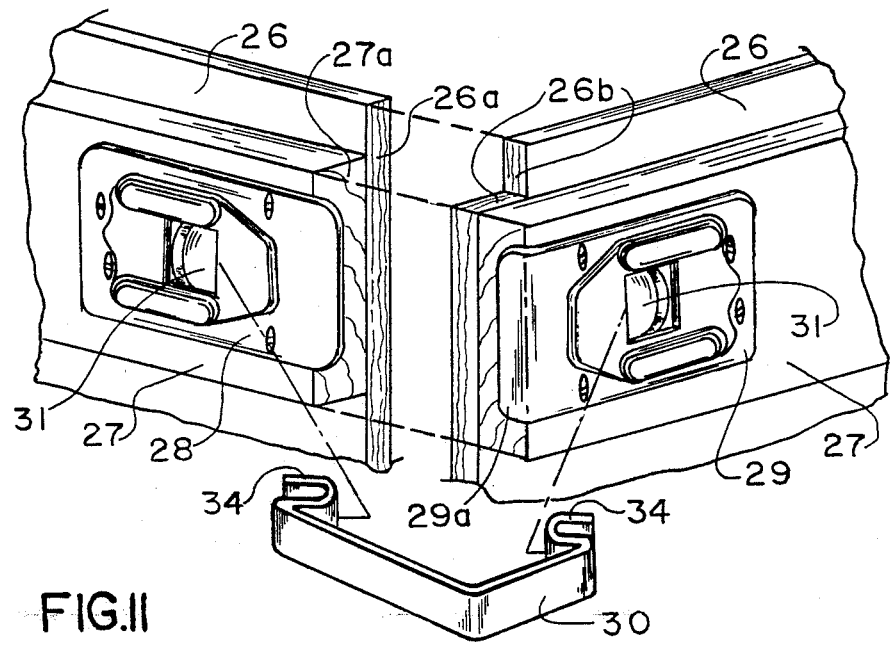

As indicated above, FIG. 11 is a fragmentary enlarged view of the panel and joint parts at one of the upright corners of the container. As will be seen from FIG. 11, the panel boards 26 and the reinforcement strips 27 are differently configured at the opposite ends of the panel. Thus, as seen in FIG. 11, one end, shown at the left side of FIG. 11, of the panel board 26 and the reinforcement strip 27 are both terminated or cut-off in a plane perpendicular to the panel. These end surfaces are indicated at 26a and 27a, and these surfaces are adapted to abut against the inside surface of the panel 26 at the other side of the corner, as is indicated by the dot and dash lines between the two panels shown in FIG. 11. The panel board 26 of the right-hand component shown in FIG. 11 may also be notched as indicated at 26b in a configuration conforming with the adjacent parts of the left-hand panel when the two panels are brought together to complete the joint. This notching will accommodate a reinforcement strip extended downwardly of the edge of a lid or cover for the container described hereinafter with particular reference to FIG. 18.

Figure 12:
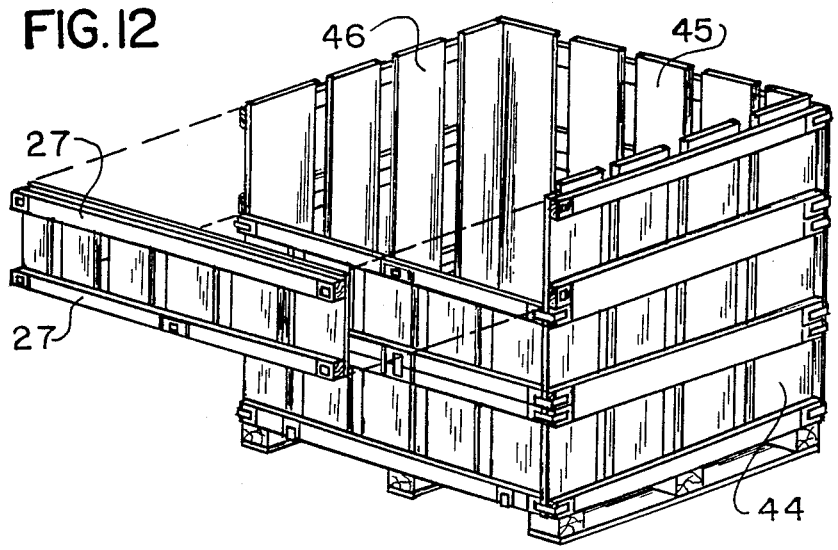

A spring clip fastening device as described hereinafter is provided at the joint shown in FIG. 11, but before explaining the preferred structure of the fastening parts, it is here pointed out that the two end configurations of the panels shown in FIG. 11 are provided on each panel, one configuration being provided at one end of the panel and the other configuration at the other end of the panel. In view of this, it will be seen that in the construction of a container such as shown in FIG. 12, the panels overlap each other at the corners of the container in a series extended in one direction around the four upright corners of the container. This serial overlap is preferably employed in combination with certain features now to be described with reference to the fastening devices which, as will be explained, involves a serial overlap of parts extended around the container in the direction opposite to the overlap series of the panels themselves.

In considering the configuration and manner of mounting the components of the fastening devices, as shown in FIG. 11, attention is also directed to certain features of the fastening devices which are illustrated not only in FIG. 11 but also in FIGS. 20 to 24.

Each 90 degree fastening device is made up of three components, i.e., a pair of fastening plates and an interconnecting spring clip generally indicated at 30 in FIGS. 11 and 23. The two fastening plates 28 and 29 are basically of the same configuration, comprising a stamped sheet metal piece having an aperture 31 and if desired, certain reinforcing ribs or the like such as indicated at 32, as well as holes 33 (see FIGS. 20-22) provided for attachment screws for securing the fastening plates to the panel pieces to be interconnected. As will be seen from FIGS. 11, 20 and 21, these two fastening plates 28 and 29 are identical in configuration, except for the ending or flexing of an end portion 29a on one of them adapted to overlie the end surface at one end of each panel as seen toward the right of FIG. 11. As will also be seen from FIG. 11, the outer end of the fastening plate 28 mounted at the other end of each panel, as shown at the left in FIG. 11, extends beyond the end surfaces 26a and 27a of that panel in order to overlie a portion of the end surfaces of the other panel. It is here important to note that this overlapping of the fastening plate 28 of the left-hand panel shown in FIG. 11 with respect to the end surfaces of the right-hand panel shown in FIG. 11, provides an overlapping interrelationship which occurs in a series extended around the upright corners of the container in a series the direction of which around the container is opposite to the overlapping series of the panels themselves as above described. The arrangement of these two overlapping series to extend in opposite directions around the container provides rigidity and integrity of the panel assemblies making up the containers, and this desirable characteristic is present in all embodiments of the containers which may be produced in accordance with Applicant's modular system.

As appears from FIG. 11, the joint is also sturdily secured by the application of the spring clip such as indicated at 30 having detents 34 at both ends which are adapted to engage in the apertures 31 and thus retain the adjoining ends of the panels at the upright corners in the desired 90 degree relationship.

In connection with the fastening plate 29, it is particularly to be noted that the bent edge portion 29a not only serves to facilitate positioning and mounting of the plate 29 at the end of the batten 27, but this bent edge 29a provides protection for the covered underlying corner or edge of the batten 27. This covered edge of the end of the batten is a prominently exposed portion of the panel which otherwise would be subject to abrasion in the handling and shipment of the carton or container. From FIG. 11, it will be seen that the end portion of the panel 26 and batten 27 at the left side of the joint shown in FIG. 11 are not subject to such abrasion, because of the overlap of the portions of the panel and batten at the right-hand side of FIG. 11.

Although certain other forms of right angle or 90 degree spring clip fastening devices may be employed, it is contemplated according to the invention that the fastening plates for the connecting devices be arranged and connected with the opposite ends of each panel in order to provide the overlapping arrangement fully described above and illustrated in FIG. 11 in a manner providing the overlapping series extended around the container in a direction opposite to the overlapping of the end portions of the panels themselves.

It should be understood that these 90 degree fastening devices may be employed in the position of the corner fasteners 24 shown in FIG. 1, and also in various other forms of containers and enclosures described more fully hereinafter, it is preferred to employ the opposite series of overlappings at the upright corners of each container. The type of spring clip fastening device shown in FIG. 11 and described above may also be employed in the interconnection of upright walls of a container either with a top wall or with a bottom wall, such as a pallet. Where the spring clip fastening device just described is employed between a side wall and a top wall, as illustrated, or example, in certain embodiments described hereinafter and also at the top of FIG. 1, certain features illustrated in FIG. 18 are desirably employed. Thus in FIG. 18, a side wall panel is indicated at 26 having a reinforcement strip 27, and a top wall component is shown at 36, having a reinforcement strip 35 overlapping the side wall component 26. The fastening plate 29 also appears in FIG. 18 in a position overlying the edge of the top wall component 36 and the top wall component is desirably provided with an aperture such as indicated at 37 in FIG. 18 in a position underlying the aperture 31 of the fastening plate, and the detent 34 of the spring clip 30 may thus be accommodated within the aperture 37 in the top wall 36. A cup formed of sheet metal or plastic 39 is desirably inserted in the aperture 37 in the top wall, thereby providing a closure which would provide weather protection or prevent entrance of water in the event the container is exposed.

The embodiment of FIG. 18 also shows a feature which may be employed on any panel having a fastening device of the kind disclosed. Thus, a flexible braided attachment wire or cord 40 may be fastened to the panel wall, for instance, the top wall 36 shown in FIG. 18, by a fastening stud 41, this attachment cord being connected with the spring clip 30, thereby preventing separation or loss of the spring clip. The fastening stud may also serve for attachment of the connector plate 29.

FIG. 19 is an enlarged view, with a portion broken out illustrating a reinforcement strip or batten adapted to be employed on various container components, such as the components 27 fully described above with particular reference to FIG. 11 Toward one end of this component (the left hand end as viewed in FIG. 19) an aperture 38 is provided in a position with relation to the end of the batten providing for cooperation with fastening plates and spring clips such as shown in FIG. 11. Apertures 38a may also be provided in positions adapted to receive the fastening studs or screws by which the fastening plates are secured to the batten. A similar aperture 38b may be provided intermediate the ends of the batten in order to provide for cooperation with fastening plates for fastening devices of the kind shown in FIG. 11. The dimensions indicated by the arrows x and x' are the same, and this is provided so that the appropriate fastening plates may be attached at the end of the batten or along the side thereof.

Figure 16:
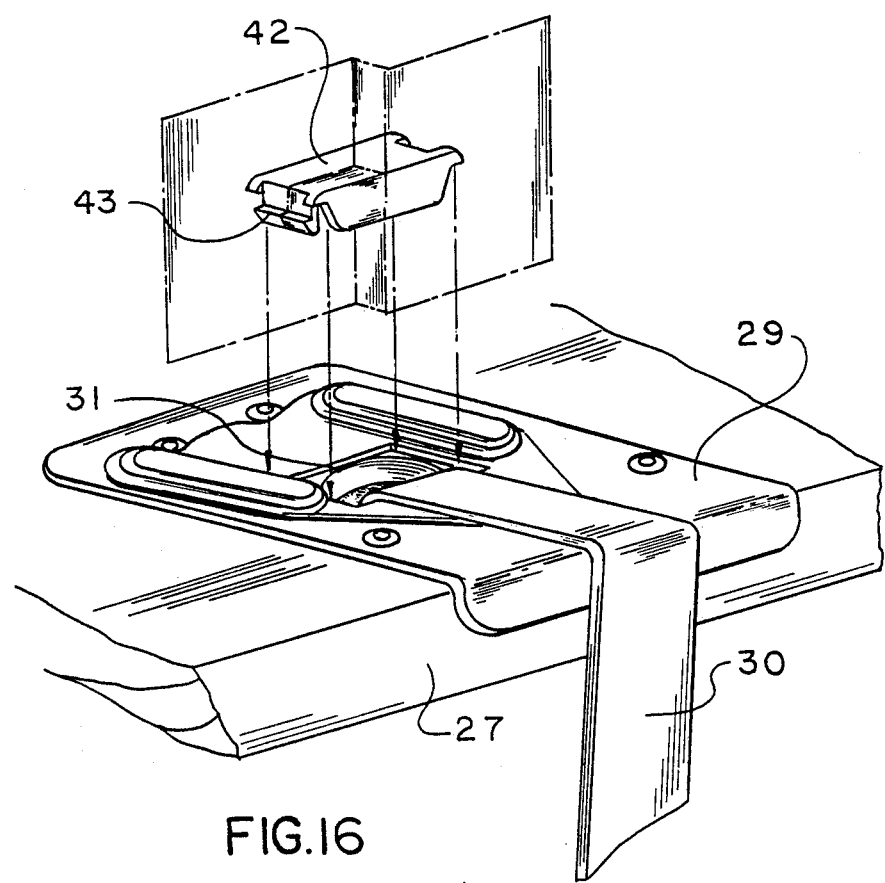
Figure 17:
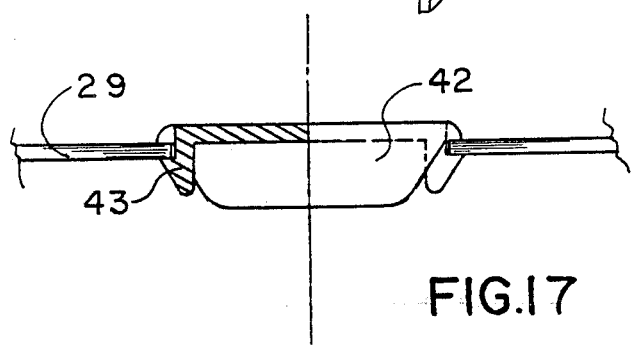
Figure 25:
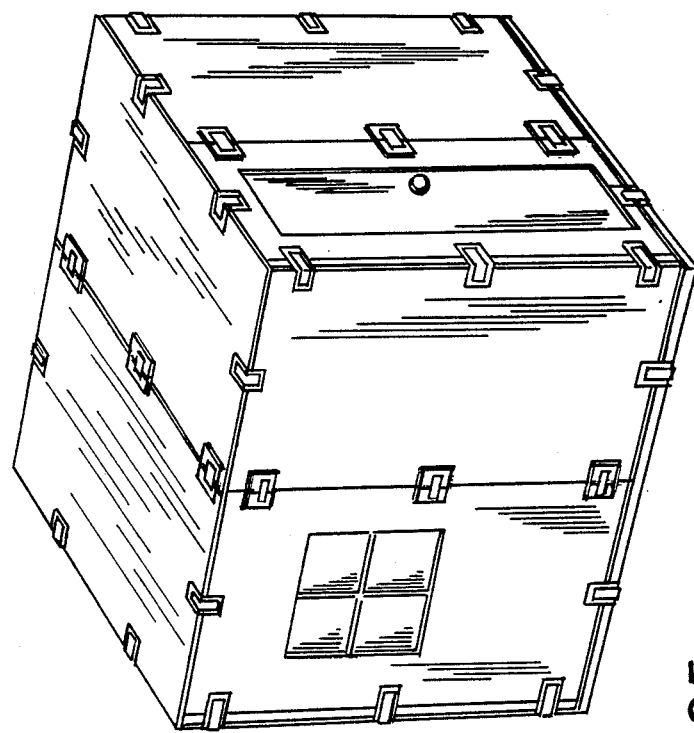

Another feature contemplated for use in accordance with the present invention is illustrated in FIGS. 16 and 17. In this arrangement, a top wall or panel such as indicated in FIG. 18 at 36, may be employed, and the top wall may be connected with a side wall by means of a spring clip fastening device comprising a fastening plate 29 and a spring clip 30. In many situations, it is desirable that the container be tamper proof, and this may be accomplished in a simple manner as illustrated in FIGS. 16 and 17. Here it will be seen that a locking or security device 42, formed, for example, of tough, break-resistant nylon or other plastic material is formed and shaped in a manner to provide for insertion into the aperture 31 of the fastening plate 29 after the detent of the spring clip, such as indicated at 34 in FIG. 18, has been inserted the device 42 having projections 43 at its ends adapted for spring engagement under the edges of the plate 29 at opposite side edges of the aperture 31. This device when inserted will prevent separation of the detent and thus of the adjacent end of the spring clip 30. Being formed of a plastic material, the security device may, if desired, be ruptured and then removed in order to permit the separation of the detent from the aperture 31 in the fastening plate 29. It is contemplated that this security device 42 be formed of a brilliantly contrastingly colored plastic material, so that its presence or absence would readily be recognizable in the use of the cartons and associated equipment.

In connection with the use of a security device such as illustrated in FIGS. 16 and 17 it is to be noted that in another embodiment of the invention a security device 42 may be employed, formed of a particularly tough plastic material which would not readily be rupturable and would therefore normally remain installed in the aperture 31. Such a device may be employed in order to hold one end of the spring clip against separation. Because of the shape of the detent 34 (see also FIG. 18), the security device 42 will prevent upward displacement and disengagement of the detent 34, but the device 42 will not prevent partial rotation of the other end of the spring clip, thereby permitting disengagement of the other end and opening of the joint, without separation of the end of the spring clip engaged in the aperture in which the security device is inserted. From FIG. 18, it will be seen that the detent 34 has freedom to swing downwardly into the aperture 31 when the other end of the spring clip 30 is disengaged, and this motion will not be impeded even when the security device 42 has been inserted into the aperture 31 in the manner shown in FIG. 16. This feature may be employed in order to retain the spring clip in its associated relationship to one of the panel pieces. For this purpose, it would not ordinarily be contemplated to employ a brilliantly contrasting color, as is suggested in the embodiment described above where it is contemplated that the security device 42 be ruptured and removed when it is desired to open that particular joint.

As above pointed out, the system of the present invention including the spring clip fastening devices incorporating bridge plates, as in FIGS. 1 to 9 inclusive, and also incorporating the angular spring clip fastening devices particularly illustrated in FIGS. 11 and 20 to 24 inclusive, are desirably employed where the containers to be assembled not only include side wall panels meeting at 90 degree corners, but also include panels positioned in a common plane in a side wall or in the top or bottom of a container. One embodiment illustrating the combination of such components appears in FIG. 1 and others are referred to hereinafter in connection with certain other figures, particularly FIGS. 31 and 32. It is here further pointed out that in any of such modular constructions, at any 90 degree corner, especially at the 90 degree upright corners of a rectangular container, the overlapping interrelationships in series extended around the upright corners of the container in opposite directions as above explained with particular reference to FIG. 11, is of importance and facilitates the establishment of the modular system herein contemplated, whether or not the particular container being constructed contains more than one panel lying in the common plane of any given wall.

Other forms of containers are illustrated in various other figures as follows. The container shown in FIG. 12 has four upright walls meeting at 90 degree corners and three of those walls identified by the numbers 44, 45 and 46, are formed of vertical boards which are bound together by horizontal strips or battens and integrated into a single wall structure having spaces between the individual vertical boards of each wall. The wall of this container toward the front as viewed in FIG. 12 is also formed of vertical boards, but the boards are subdivided into horizontally extended sections having interconnecting and reinforcing strips 47 at the upper and lower edges thereof. In FIG. 12, therefore, the container walls are integral walls except for the front wall which is made up of three superimposed panels. Notwithstanding the differences between the front wall and the other side walls of the container of FIG. 12, the configuration of the spring clip fastening devices may be the same as shown in FIG. 11, and in addition, it is preferred that the walls and the clips having the opposite orientations of overlapping ends thereof in the sequences extended around the container as in FIG. 11 Thus, the container of FIG. 12, like the container of FIG. 10, has various of the advantages of the serial and opposite overlapping of the end portions of the panels and of the fastening plates 28. As will be seen in FIG. 12, the plates 13 and spring clip fasteners 19 are diagrammatically indicated as being provided along edges of panels lying in the same plane intermediate the corner fastening devices of the kind shown in FIG. 11.

Figure 13:
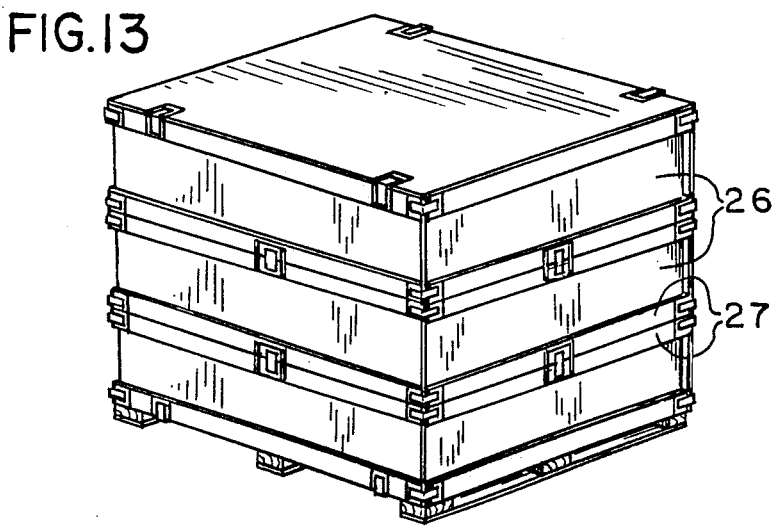

FIG. 13 is a view illustrating another modular container in which all four sides of the container are made up of panels of the kind indicated at 26 and 27 in FIG. 10 but further having a top wall secured to the side walls and also having a pallet at the bottom to which the side walls are connected.

Figure 14:
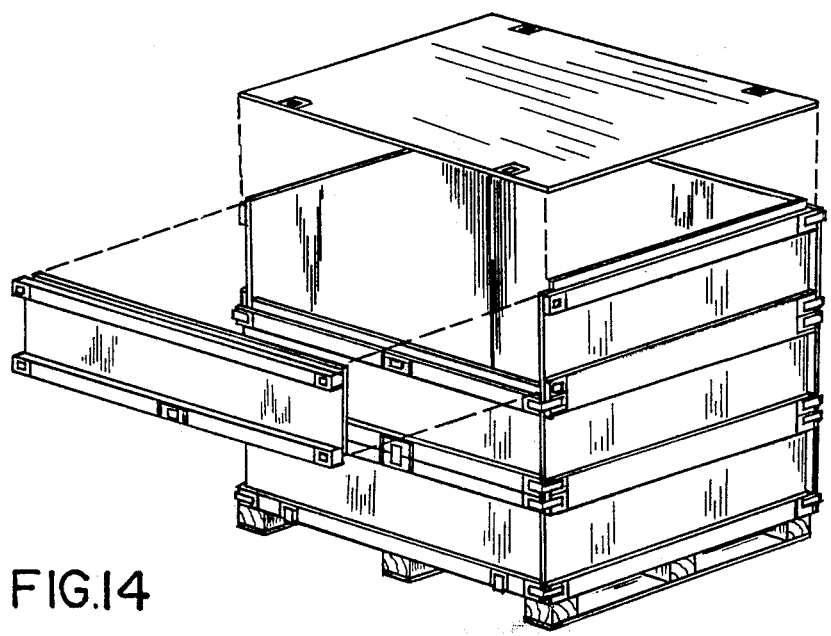

FIG. 14 illustrates an arrangement similar to FIG. 13. In this embodiment, the front wall is modular, being formed of a vertically superimposed series of panels, and the other three walls and the top wall are all formed of a singled piece or component Notwithstanding these differences, the desired corner overlappings in opposite directions is also employed.

In FIGS. 13 and 14, as well as in certain other embodiments illustrated herein, it is contemplated that the individual modular panels may be of a length with which it would be preferred to provide bracing in the mid-region or even at several points along the length of the panels. For this purpose fastening devices of the kind employing bridge plates such as described above in connection with FIGS. 1-6, may be used to interconnect the superimposed edges of adjoining panels as is diagrammatically indicated in FIGS. 13 and 14. Such fastening devices having bridge plates may also be employed in other arrangements, such as in the walls shown in FIG. 25 and in the roof shown in FIGS. 25–28 and also in the roof of such enclosures where more than one piece is employed in a common plane.

Still further, as pointed out hereinafter with particular reference to FIGS. 31 and 32, fastening plates for corner and edge-to-edge panel assembly may be provided at an edge of a panel so that such panel may alternatively be used for interconnection with another panel either at a corner or in a flat surface of the container.

Figure 15:
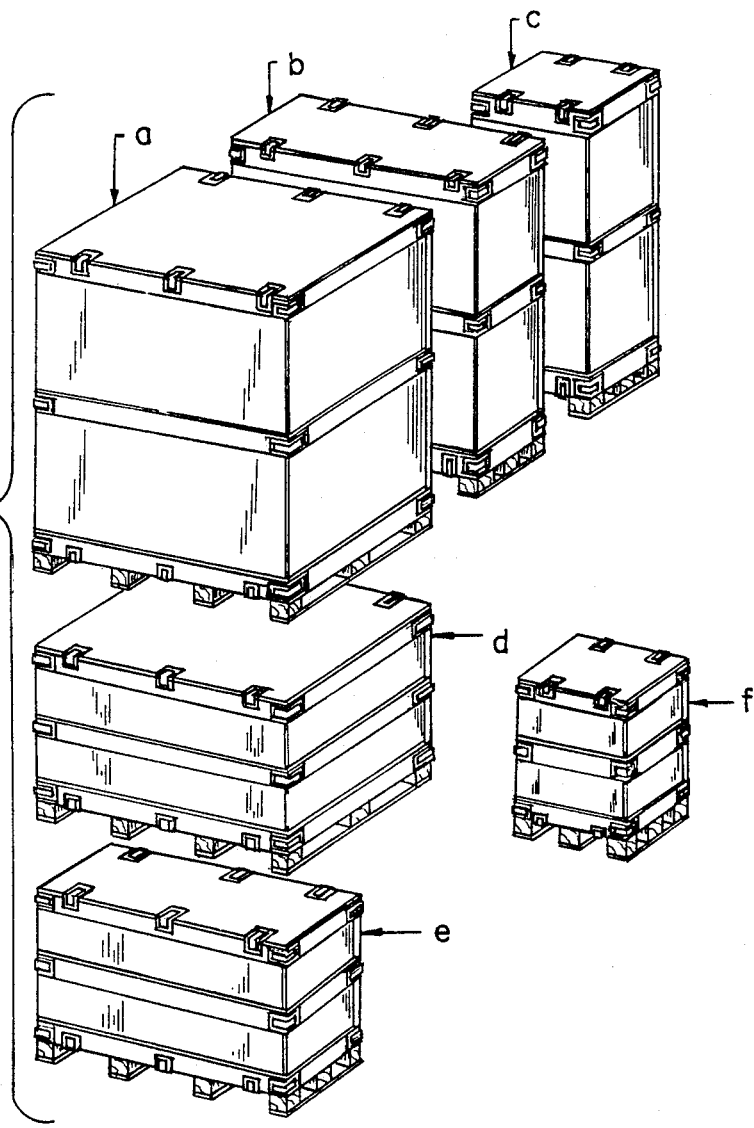

FIG. 15 is a view illustrating six container configurations each involving a plurality of superimposed panels in each side wall, but illustrating also the manner in which panels of different horizontal and vertical dimensions may readily be adapted for incorporation into containers adapted to define an interior volume of a wide variety of sizes and shapes. In this series, it is contemplated that the side walls be fastened to a pallet construction at the bottom and further that a top wall be provided, as will readily be apparent from FIG. 15. Notwithstanding the differences in length of certain of the panel components, it will be understood that the opposite serial overlappings of the ends of the panels and of the fastening plates will again be used in the variety of modular containers indicated in FIG. 15.

In connection with the various containers illustrated in FIG. 15, it is first noted that the side walls of the three containers indicated by the letters a, b and c are all formed from panels of two sizes, the difference between the panels of those two sizes being that the smaller of the two are of one-half the length of the larger. Notwithstanding that only two different panel sizes are employed, the sides of three different container configurations may readily be formed. The same interrelationships between the panels and the containers themselves are also present in the three containers identified by the letters d, e and f in the lower portion of FIG. 15. Thus, for the side walls of the three panels d, e and f only two different panels are needed. The panels used in the containers d, e and f are of different height than the panels used in containers a, b and c. In one preferred embodiment, the height of the panels used in containers d, e and f would be one-half of the height of the panels used in containers a, b and c, and this would provide for modular interchange of the panels as desired.

It will further be understood that in either of the groups of containers represented by the letters a, b and c on the one hand and d, e and f on the other hand, still other cartons may be developed from the same components; and in addition, it is further contemplated that in the modular system of the present invention, the horizontal length of the panels used in the cartons a, b and c on the one hand and in the cartons d, e and f on the other hand are desirably of the same horizontal dimension. This modular characteristic would still further provide for assembly of containers in which side walls may have panels of both of the widths shown in the upper and lower portions of FIG. 15. If desired in such compound assemblies, panels lying in a common plane at any side of a container may be interconnected by the type of fastening devices incorporating bridge plates, as shown in FIGS. 1 to 6. In all instances of modular assembly, it is contemplated that the overlapping of the panels at the vertical corners and the overlapping of the attachment plates of the spring clip fastening devices should be arranged in oppositely extending series around the perimeter of the container, in order to establish and maintain the secure and rigid assembly provided by such opposite series overlapping, as fully explained above with particular reference to FIG. 11.

FIGS. 25 to 28 are views of still other enclosures, these enclosures being of sufficient dimensions, especially in the vertical direction, in order to accommodate human occupancy, and it is contemplated that such enclosures may be employed, for example, in areas of catastrophic disasters, for instance, earthquakes, floods or the like. Here again, the enclosures may be made up of panel components having the desired serial opposite overlapping of the ends of the panels and of the joint plates of the fastening devices. If desired, such enclosure components may also be provided with doors and windows. If desired, enclosures of this type provided for human occupancy may be formed of a wall and a roof and may have reinforcing strips mounted on the interior thereof, instead of on the exterior, as in most of the cartons described above. This provides cavities on the inside in which sheets of thermal insulating material may be attached. It will be understood that the spring clip fastening devices shown in FIGS. 25 to 28 are only diagrammatically indicated, but may conform either with the type of fastening devices incorporating a bridge plate, as in FIGS. 1 to 9, or the type of devices shown more specifically in FIGS. 11 and 20 to 24 inclusive.

Figure 27:
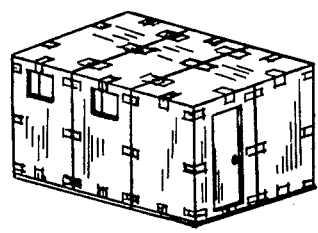
Figure 28:
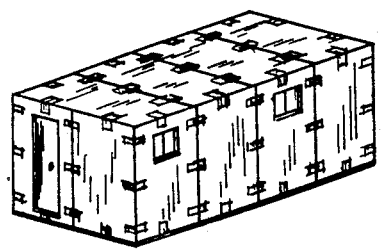
Figure 26:
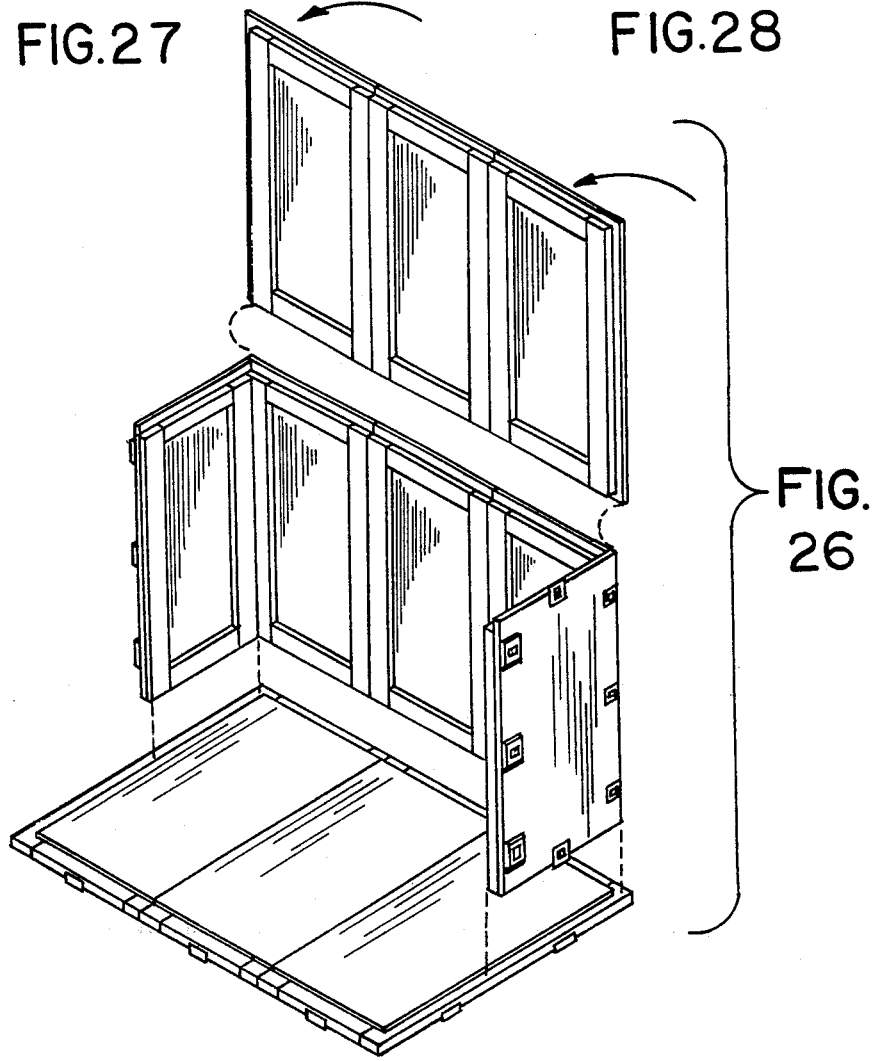

In connection with the type of enclosures particularly providing for human occupancy, as shown in FIGS. 25 through 28, it is of advantage that the invention provides a modular construction by which such enclosures can be erected in various sizes, an arrangement having three units being illustrated in FIG. 27 and an arrangement having four units being illustrated in FIG. 28. Other multiple arrangements may be employed, and enclosures of this kind can even be modularly enlarged after initial construction.

Referring now to FIG. 22, it will be noted that the Figure illustrates a plate 28a basically the same as the plate shown in FIGS. 20 and 21, except that one edge of the plate has been cut-off, which may be desirable in certain special configurations, especially where the plate is used at a corner between a side wall panel and a top or bottom wall.

It is also pointed out that for certain purposes, it may be desirable to change the location of the edges of the aperture 31 in a fastening plate such as shown in FIG. 22 which may be employed at different distances from the edge or corner of a panel piece. This will accommodate the use of wood or panels of various different thicknesses, while still employing the same size spring clips.

An alternative embodiment of spring clip is illustrated in FIG. 24. Here, one end of the clip is provided with the detent 34, but the other end is provided with a hook element 48 and this may be employed in situations where release of the spring clip by employment of a tool would not be feasible because of space limitations, for instance, in a situation where that end of the spring clip was engaged in the aperture of a mounting plate located under a pallet.

Figure 31:
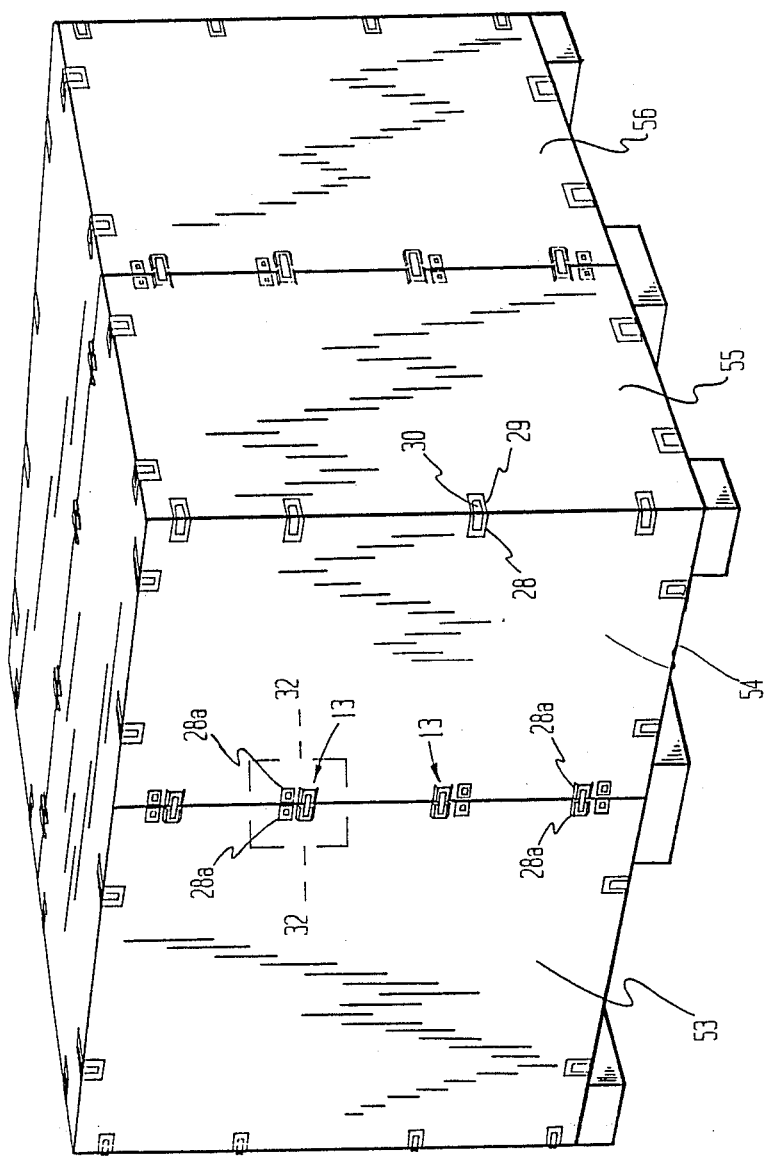
Figure 32:
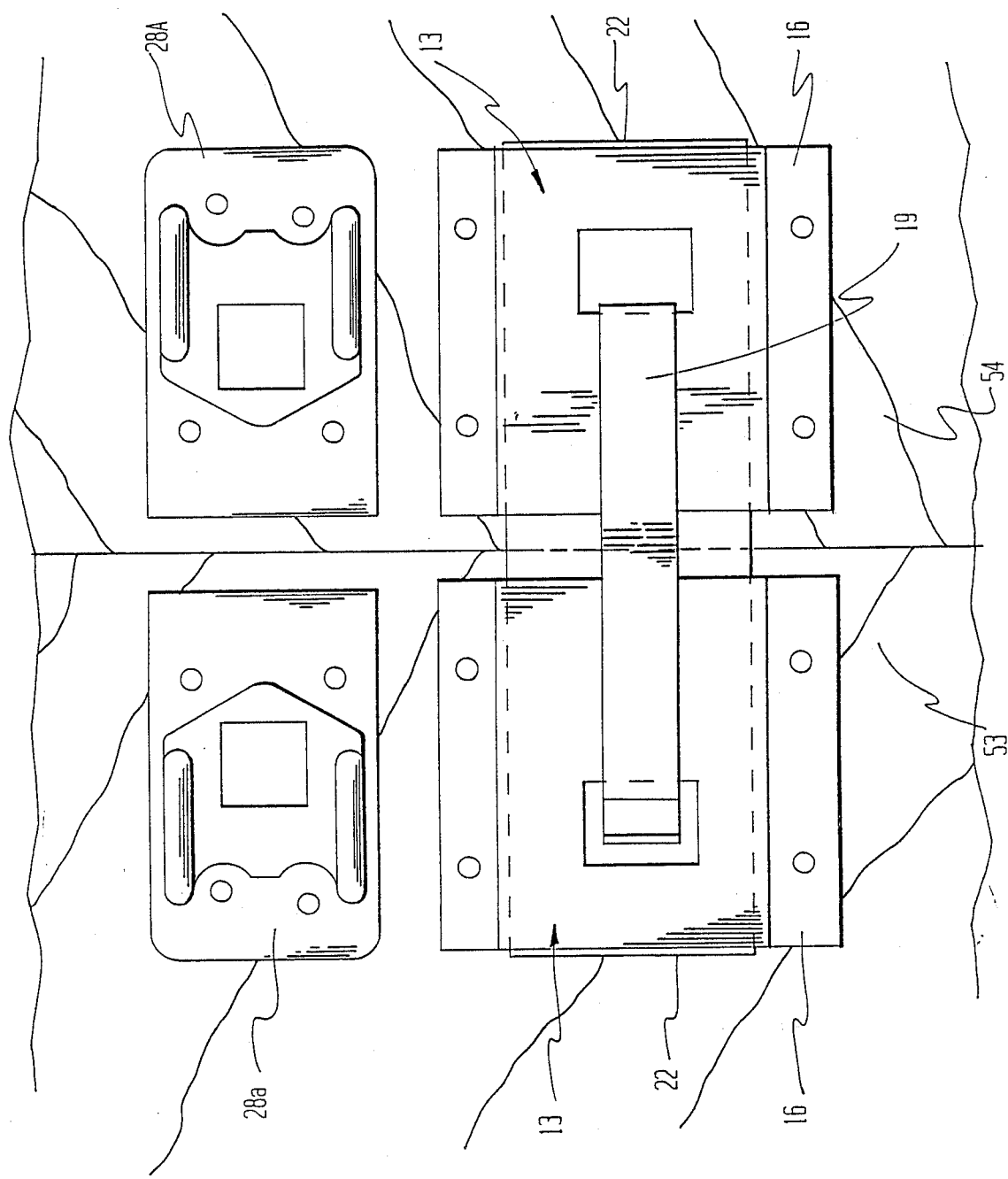

Turning now to FIGS. 31 and 32, it is first pointed out that these figures particularly illustrate embodiments of the clip or fastening systems of the present invention incorporated in cartons or enclosures in a manner making practical the alternative use of certain enclosure panels either in a common plane or at angles to each other.

In FIGS. 31 and 32, particular attention is directed to the two panels 53 and 54 presented toward the left in FIG. 31 and also to the two panels 55 and 56 presented toward the right in FIG. 31.

The adjoining or abutting edges of the panels 53 and 54 are edges of panels which are adapted to be employed alternatively either in a common plane or at a carton corner. In the illustration of FIGS. 31 and 32, those panels 53 and 54 are shown in edge-to-edge abutting relation in a common plane, and fastening devices of the kind shown in FIGS. 1 to 6 are illustrated at the junction between the panels 53 and 54. These devices include the clip plates 13 and the interconnecting spring clip 19 and bridge plate 22 of the configuration and arrangement described above with particular reference to FIGS. 1 to 6.

In addition, the embodiment of FIGS. 31 and 32 also includes along the same adjoining edges of the panels 53 and 54 additional clip plates identified as 28a, these clip plates being the same as that illustrated in FIG. 22. As pointed out in the description of FIG. 22, this is an alternative form of clip plate adapted for use at corners of enclosures or containers.

As will be seen from FIG. 31, a plurality of spaced clip plates of both kinds are provided along the adjoining edges of the container panels 53 and 54. However, in the embodiment of FIGS. 31 and 32, the only lip plates which are in active use along the adjoining line of panels 53 and 54 are the clip plates 13 which are adapted for connection of the panels in a common plane. As already described above in connection with various Figures, including particularly FIG. 22 the clip plates 28a which appear in FIGS. 31 and 32 may be employed when the panels 53 and 54 are assembled in positions at a corner of a container, and in that event, as described above with particular reference to FIG. 22, an angular spring clip is supplied in order to interconnect the two adjoining panels at the corner of the carton being assembled.

From the foregoing, it will be seen that as is contemplated by the present invention, individual edges of container panels may be provided with both types of fastening plates so that those individual panels may alternatively be employed either at a corner or in the flat plane of a side wall of the enclosure.

This is an important feature as it provides for alternative use of the same panels in various different positions of various containers incorporating a variety of assemblies of side wall panels and, if desired, even top wall panels.

Having in mind the modular capabilities of the system of the present invention, and further having in mind the arrangement of the parts providing for ready and convenient use and reuse of all of the major components, the invention makes provision for packaging components from which containers may be formed. A system of this type is shown in FIGS. 29 and 30. In these Figures, a pallet is indicated at 49, and for packaging purposes, a mass of spring clips such as indicated at 50 may be assembled on top of the pallet 49. A lid such as indicated at 36 and side wall panels such as indicated at 51 may then be stacked over the nested spring clips 50 and the entire assembly may be fastened together by conventional metal straps 52. In this way, containers may be returned to a point of origin in shipping systems, or may be stacked in warehouses for shipment to a point of se either for containers for shipping purposes or for enclosures of the kind adapted for human occupancy. In accordance with FIGS. 29 and 30, loss of the spring clips may be avoided in shipment or storage.

FIGS. 33 to 42

In the embodiment of FIGS. 33, 34, 35a, 35b and 35c, the paneled side walls of the container are adapted to be associated with a pallet of conventional or known type, such as indicated at 57. Each side wall of the container in this embodiment includes at least one and preferably a plurality of superimposed side wall panels 58. In this embodiment, each panel is of identical construction so that the individual panels may be used in any of the four side walls of the container and in any vertical position in the side wall.

At each end of each panel, a flat piece or plate 59 is provided, this piece being positioned with its lower end projecting slightly below the lower edge of the panel 58 on which it is mounted, and with its upper end positioned slightly below the upper edge of the panel 58 on which it is mounted. The proportioning of the panels 58 and the pieces or plates 59 is such that when the panels at a given level are interconnected at the corners, the lower projecting ends of the plates 59 overlap with the pallet 57 where the panels are incorporated in the first layer of the carton panels. In the second layer of the carton panels, the lower edges of the plates or flat pieces 59 overlap with the upper edge of the lower panel 58.

When the assembly is completed this provides for guided vertical overlapping of the panels with respect to the pallet and also with respect to the upper and lower layers of superimposed panels.

Figure 42:
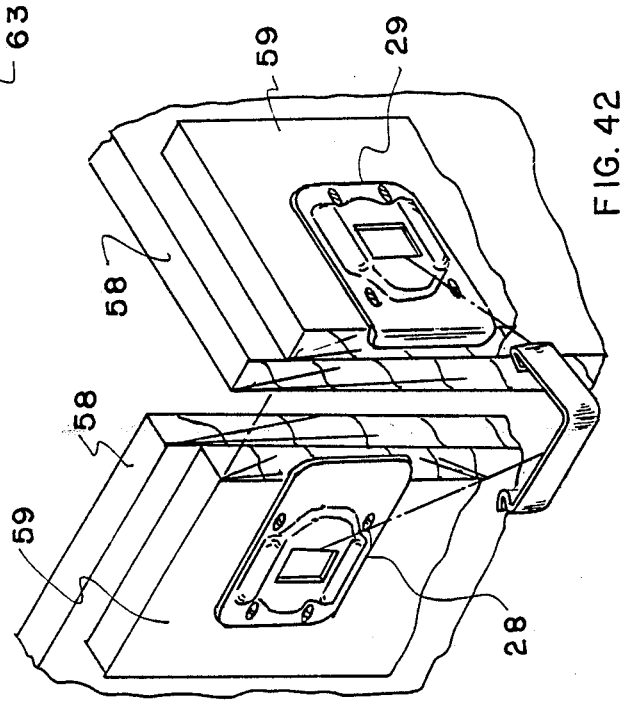

As will be apparent from the description given hereinafter with respect to FIGS. 35a, 35b, 35c and 42, it will be seen that provision is made for the use of fastening devices including apertured plates and spring clip devices of the same general kind as described above with particular reference to FIG. 11. These devices provide for serial overlap of panel ends in one direction around the perimeter of the carton and of apertured plates in the other direction around the perimeter of the carton. In FIG. 42 various joint parts are identified by the same reference numerals as in FIG. 11, but it will be seen that the joint parts are attached to the panel plates 58 and 59 being employed in this embodiment to provide for vertical overlapping as well as serial overlapping around the corners. It will also be noted that the separable spring clip is of the type shown in FIG. 24 and described above in connection with FIG. 24. Alternatively, the spring clip may be of the configuration shown in FIG. 23.

It is here pointed out that by the combination of these features the container concurrently employs two different types of overlapping or interlocking of the parts, one type being effective in the vertical planes of the side walls and the pallet edges and the other being effective in both directions around the perimeter of the container.

This combination provides for maximizing the strength and durability of the carton under a wide variety of conditions of use. The configuration of the panels and of the panel interconnecting joints also has, as a further advantage, the fact that the panels are all interchangeable either around the perimeter of the container or vertically in the side walls of the container. Therefore, in the event of damage to a single panel, the container may be repaired merely by replacing only one panel, regardless of the position of the damaged panel in the container. This simplifies manufacture, handling, shipment and replacement of container parts, in addition to providing exceptional rigidity and strength.

Figure 35C:
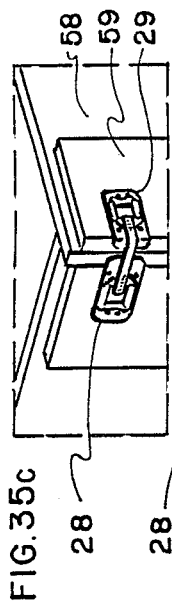
FIGS. 35a, 35b and 35c are enlarged fragmentary views of corners of the assembled structure respectively illustrating the corner portions as indicated by the dash lines 35a, 35b and 35c applied to FIG. 34.
Figure 35B:
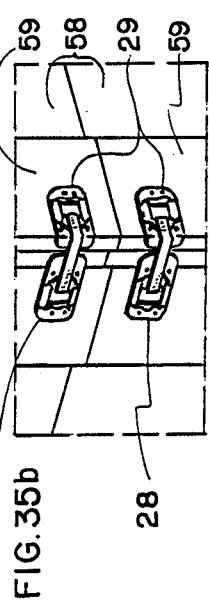
Figure 35A:
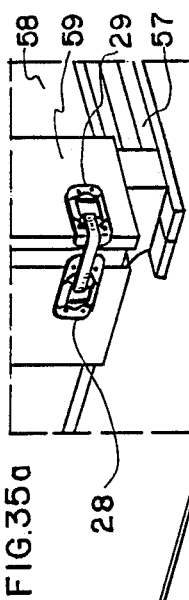

Some description of the construction of the panel interconnecting means or devices is given above in connection with FIG. 42 and also FIGS. 35a, 35b and 35c.

Attention is now directed to certain other forms of containers embodying the features referred to above in connection with FIGS. 33, 34, 35a, 35b, 35c, and 42.

Figure 34:
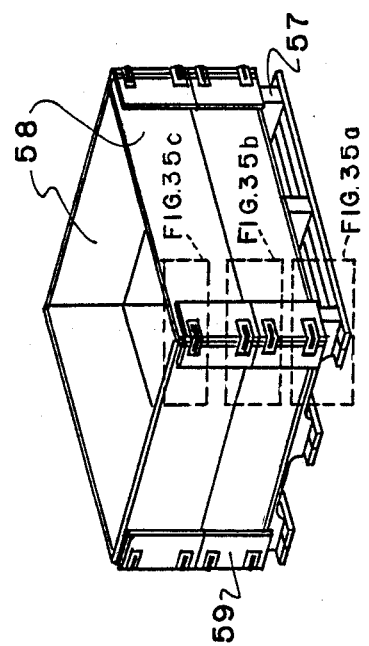
Figure 33:
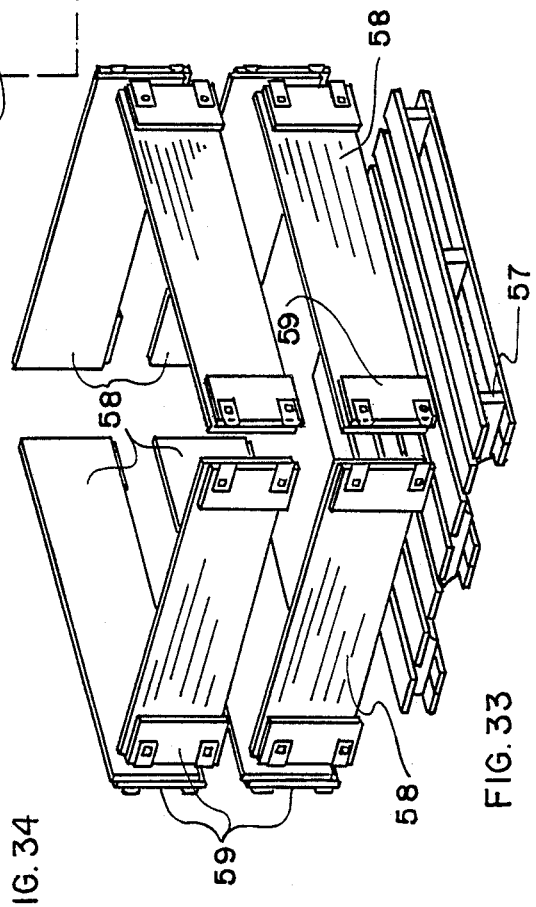
Figure 38:
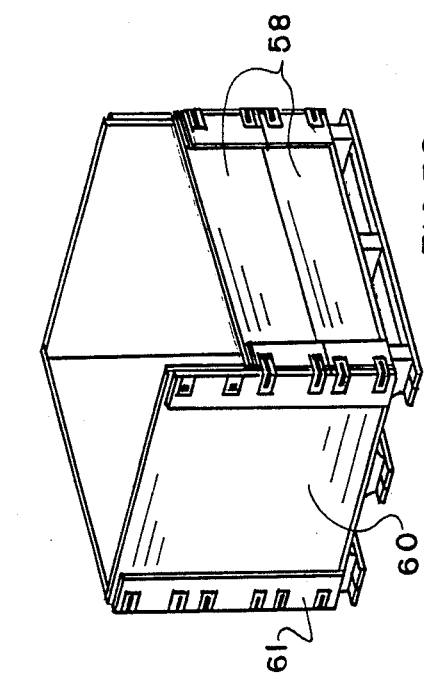
Figure 39:
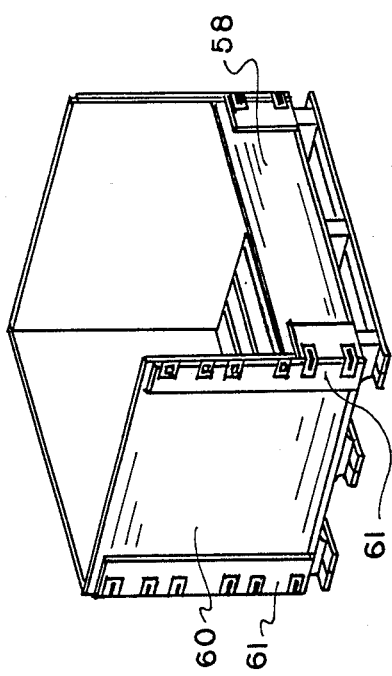
Figure 37:
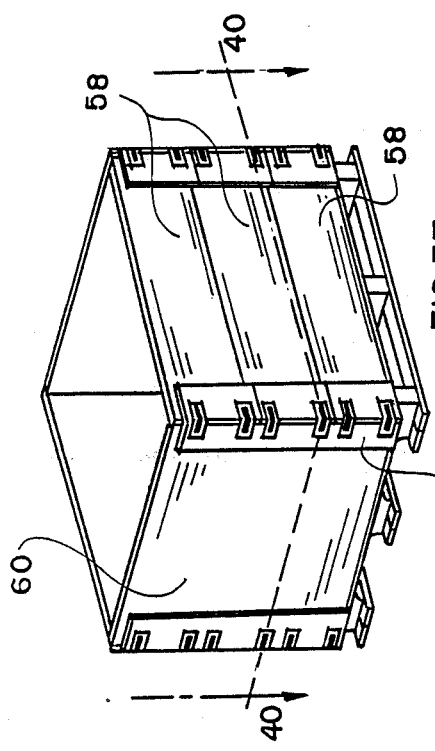
Figure 36:
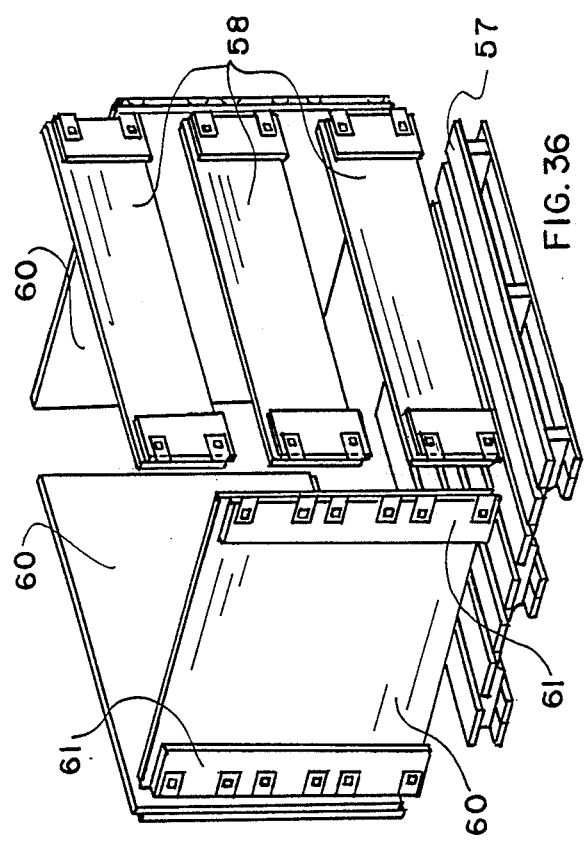

Thus, in FIGS. 36, 37, 38, 39 and 40, there is disclosed a container adapted to be used with a pallet which may be of the same construction as indicated at 57 in FIGS. 33 and 34, but in this embodiment, three panels 58 are superimposed in the front wall of the container, and each of the other three side walls 60 of the container comprise a single sheet each infilling a complete side wall of the container. It is here contemplated that flat pieces or plates 61 be provided at the vertical edges of the side walls 60, with the lower edges thereof projecting downwardly in order to provide for appropriate overlapping with the pallet with which the container is adapted to be used.

In this configuration, it is preferred to employ panels 58 and 60 in which the vertical height of the panels 60 represents a multiple of (for instance, 2 or 3 or 4 times) the height of individual panels 58. For special loading operations, it is also contemplated that the smaller of the two panels may be used on more than one side of the container.

With a construction as shown in FIGS. 36, 37, 38 and 39, special procedures with respect to loading and unloading of the container may be employed because of the provision of stepwise insertion or removal of the horizontal panels 58. For the handling of certain types of materials and products, this flexible capability has distinct advantages as compared either with complete loading or unloading with respect to a completely assembled container. The loading and unloading capabilities of this embodiment is also of great advantage for certain types of products as compared with an arrangement in which multiple layers of panels throughout the entire perimeter of the container must be mounted or dismounted layer-by-layer.

Figure 40:
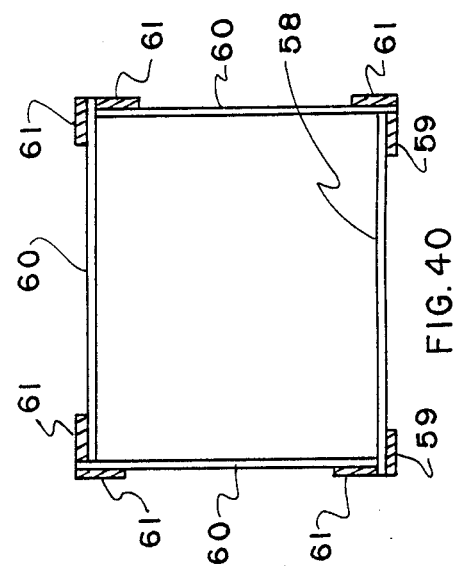

In FIG. 40, the serial overlapping around the corners is illustrated, but the fastening plates and clips are omitted. It will be understood that the apertured fastening plates and clips employed at the corners of an embodiment such as shown in FIGS. 36 to 39 may be of the same type as described above in connection with FIGS. 33, 34, 35a, 35b, 35c, and 42.

Figure 41:
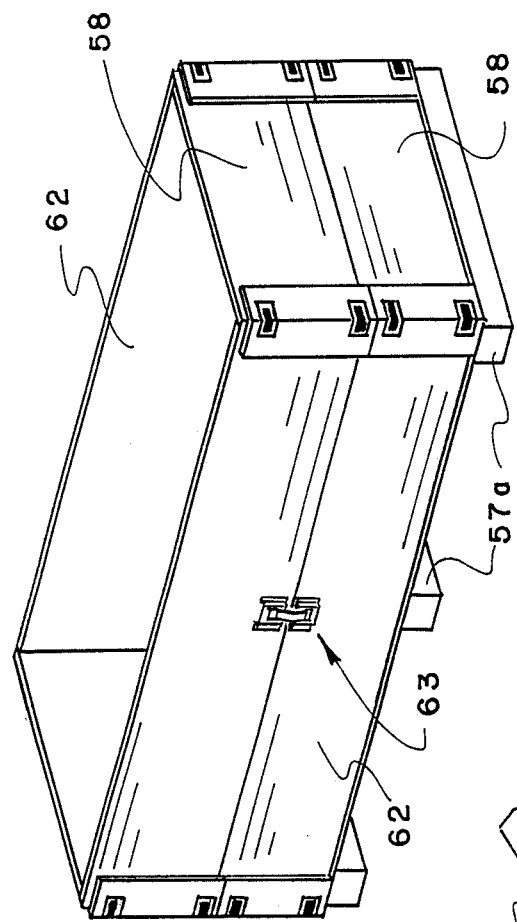

In FIG. 41, there is illustrated a container of the general type shown in FIGS. 33 and 34, but in this embodiment the pallet 57a being used is of elongated shape instead of the square shape shown at 57 in the other Figures. The container is made up of panels some of which, such as indicated at 58 at the ends of the container, may be of the type and proportions indicated in FIGS. 33 and 34 and may have the same type of corner connection parts as illustrated in FIGS. 35a, 35b and 35c and in FIG. 42. At the front and rear sides of the container shown in FIG. 41, the panels 62 are of greater length than the panels 58, for instance of a length appropriate for use with the longer pallet 57a. In the event of employment of side panels of substantial length, it may also be desirable to employ flat wall interconnecting devices along the adjacent edges of the longer panels, such as indicated in general at 63. These devices 63 appropriately incorporate bridge plates as indicated by reference numeral 22 in FIGS. 1 to 6.

I claim:

1. A container having walls defining an interior container volume of rectangular shape, the walls including four upright side walls meeting at upright corners of the container and a substantially rectangular base, each of a plurality of walls being formed of superimposed interchangeable panels extended horizontally between the upright corners, the lower horizontal edge of each of the superimposed panels having portions vertically overlapping the horizontal edge of a subadjacent panel and the lower panel horizontal edge having portions overlapping the adjacent marginal edge of the rectangular base and thereby provide guided vertical stacking and interchangeability of superimposed panels, an end portion of a first panel at one side of a corner being positioned and extended to overlap the end surface of a second panel at the other side of that corner, a spring clip fastening device for interconnecting panels adjacent each upright corner, said device including apertured plates mounted on the outer sides of the vertically overlapping portions of the panels adjacent the ends of the panels an a spring clip having end portions positioned to engage the apertures of said plates, the plate mounted on said second panel having an end abutment portion projecting beyond the end of the second panel in a position overlying the end of the first panel, and the ends of the panels adjacent each of the upright corners of the container being relatively positioned to overlap each other at said upright corner being interconnected by one of said spring clip fastening devices, with the ends of the panels overlapping each other at each corner in a first series extended around the upright corners of the container in one direction and further with the abutment portions of the plates of the fastening devices at each corner projecting in a second series extended around the upright corners of the container in a direction opposite to said first series.

2. A container having walls defining an interior container volume of rectangular shape, the walls including four upright side walls meeting at upright corners of the container, a pallet having rectangular edge portions on which the walls are supported, said walls being formed of panels extended horizontally between the upright corners and at least one of the walls having a plurality of superimposed interchangeable panels having adjacent horizontal edges, one horizontal edge of each of the superimposed panels having portions adapted to vertically overlap the horizontal edge of a subadjacent panel and the edge portions of said pallet and thereby provide guided vertical stacking of said superimposed panels on each other and on said pallet, an end portion of a first panel at one side of a corner being positioned and extended to overlap the end surface of a second panel at the other side of that corner, fastening means for interconnecting panels adjacent an upright corner, said fastening means including a plurality of fastening devices mounted on the outer sides of said vertically overlapping portions of the panels and spaced from each other along said upright corner, each of said spaced fastening devices comprising a pair of plates mounted on said vertically overlapping portions of the panels at opposite sides of said corner, disconnectable means for interconnecting each pair of plates, and each plate mounted on said second panel having an end abutment portion projecting beyond the end of the second panel in a position overlying the end of the first panel.

3. A container having side walls adapted for use with a pallet having a rectangular marginal pallet edge, the side walls defining an interior container volume of rectangular shape, the walls including four upright side walls meeting at upright corners of the container, each of a plurality of walls being formed of a plurality of superimposed groups of panels having adjacent horizontal edges extended horizontally between the upright corners, the lower horizontal edge of each of the panels having portions vertically overlapping the subadjacent panel and thereby provide guided vertical stacking of groups of superimposed panels, the lower horizontal edge of the lowermost panel being engageable the marginal edge of the pallet in overlapping relationship therewith, thereby providing for serial vertical overlapping of the groups of panels with each other and of the lowermost group of panels with the pallet, an end portion of a first panel of a group at one side of a container corner being positioned and extended to overlap the end surface of a second panel at the other side of that corner, fastening means for interconnecting panels adjacent an upright corner, said fastening means including a plurality of fastening devices mounted on the other sides of said vertically overlapping portions of the panels and spaced from each other along said upright corner, each of said spaced fastening devices comprising a pair of plates mounted on said vertically overlapping portions of the panels at opposite sides of said corner, disconnectable means for interconnecting each pair of plates, and each plate mounted on said second panel having and end abutment portion projecting beyond the end of the second panel in a position overlying the end of the first panel.

4. A container having side walls adapted for use with a pallet having a rectangular marginal edge, the side walls defining an interior container volume of rectangular shape, the walls including four upright side walls meeting at upright corners of the container, said walls being formed of panels extended horizontally between the upright corners and one of the walls having a plurality of superimposed interchangeable panels with adjacent horizontal edges and the other of said walls being formed of a single panel, one horizontal edge of each of the superimposed panels in said one wall having portions adapted to vertically overlap the horizontal edge of an adjacent panel and thereby provide guided vertical stacking of said superimposed panels and the lowermost panel edge at each side of the container having a portion adapted to overlap an adjacent edge of the pallet, one end portion of a first panel at one side of a corner being positioned and extended to overlap the end of a second panel at the other side of said corner, fastening means for interconnecting panels adjacent an upright corner, said fastening means including a plurality of fastening devices mounted on the outer sides of the panels and spaced fastening devices comprising a pair of plates mounted on the panels at opposite sides of said corner, disconnectable means for interconnecting each pair of plates, and each plate mounted on said second panel having an end abutment portion projecting beyond the end of the second panel in a position overlying the end of the first panel.

5. A container having side walls adapted for use with a base having a rectangular marginal edge, the side walls defining an interior container volume of rectangular shape, the walls including four upright side walls meeting at upright corners of the container, each of a plurality of walls being formed of panels lying in upright planes and extended horizontally between the upright corners and at least one of the walls having a plurality of superimposed panels with adjacent horizontal edges and at least one of the other three walls being formed of a single panel having a vertical dimension representing a multiple of the vertical dimension of a panel at said one wall of the container, one horizontal edge of each of the superimposed panels having portions vertically overlapping the horizontal edge of a subadjacent panel and thereby provide guided vertical stacking of superimposed panels and the lowermost panel edge on each side of the container having a portion adapted to overlap an adjacent edge of the base, an end portion of a first panel at one side of a corner being positioned and extended to overlap the end surface of a second panel at the other side of that corner, fastening means for interconnecting panels adjacent an upright corner, said fastening means including a plurality of spaced fastening devices each comprising a pair of plates mounted on the panels at opposite sides of said corner, disconnectable means for interconnecting each pair of plates, and each plate mounted on said second panel having an end abutment portion projecting beyond the end of the second panel in a position overlying the end of the first panel.

6. A container having side walls adapted for use with a base having a rectangular marginal edge, the side walls defining an interior container volume of rectangular shape, the walls including four upright side walls meeting at upright corners of the container, each of a plurality of walls being formed of panels lying in upright planes and extended horizontally between the upright corners and at least two of the walls having a plurality of superimposed panels with adjacent horizontal edges and at least one of the walls having a panel having a vertical dimension representing a multiple of the vertical dimension of another panel, the lower horizontal edge of each panel having portions adapted to vertically overlap the upper horizontal edge of a subadjacent panel with the panel resting on the base having portions adapted to overlap the adjacent marginal edge of the base, an end portion of a first panel at one side of a corner being positioned and extended to overlap the end surface of a second panel at the other side of that corner, fastening means for interconnecting panels adjacent an upright corner, said fastening means including a plurality of spaced fastening devices each comprising a pair of plates mounted on the panels at opposite sides of said corner, disconnectable means for interconnecting each pair of plates, and each plate mounted on said second panel having an end abutment portion projecting beyond the end of the second panel in a position overlying the end of the first panel, whereby panels having said first noted vertical dimension and other panels having a vertical dimension which is a multiple of said first vertical dimension may be used in combinations with each other in the construction of containers of a predetermined vertical dimension which is multiple of the vertical dimension of said first vertical dimension.

* * * * *